(12) United States Patent
Pierce et al.

(10) Patent No.: US 10,562,117 B2
(45) Date of Patent: Feb. 18, 2020

(54) CUTTING APPARATUS INCLUDING A LIQUID SPRAY SYSTEM

(71) Applicant: Illinois Tool Works Inc., Glenview, IL (US)

(72) Inventors: Kenneth R. Pierce, Arlington Heights, IL (US); Michael W. Gearhart, Schaumburg, IL (US); Jeffrey M. Swiatowy, Crystal Lake, IL (US); Mark W. Wozniak, Schaumburg, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/003,647

(22) Filed: Jun. 8, 2018

(65) Prior Publication Data

US 2018/0354046 A1 Dec. 13, 2018

Related U.S. Application Data

(60) Provisional application No. 62/517,275, filed on Jun. 9, 2017.

(51) Int. Cl.
*B23D 59/04* (2006.01)
*B23D 57/00* (2006.01)

(52) U.S. Cl.
CPC ..... *B23D 57/0092* (2013.01); *B23D 57/0007* (2013.01); *B23D 57/0038* (2013.01);
(Continued)

(58) Field of Classification Search
CPC ............ B23D 57/0092; B23D 57/0038; B23D 57/0053; B23D 57/0061; B23D 57/0007; B23D 57/0069; B23D 57/003; B23D 57/0084; B23D 59/04; B23D 57/92; B26D 3/16; B26D 1/48; B23Q 11/126; Y10T 83/7487; Y10T 83/9292; Y10T 83/852

(Continued)

(56) References Cited

U.S. PATENT DOCUMENTS 1,530,682 A 3/1925 Lyman
2,711,761 A 6/1955 Grants
(Continued)

FOREIGN PATENT DOCUMENTS

AU 2010201367 11/2010
CN 200957639 10/2007
(Continued)

OTHER PUBLICATIONS

International Search Report and Written Opinion for PCT/US2014/059619 dated Jan. 28, 2015, 11 pages.
(Continued)

*Primary Examiner* — Ghassem Alie
(74) *Attorney, Agent, or Firm* — Klintworth & Rozenblat IP LLP

(57) ABSTRACT

A cutting apparatus and the method of operating same is provided. The apparatus includes a feed tower assembly configured to be attached to an object and a frame assembly movably attached thereto. The frame assembly has arm assemblies thereon which accept a cutting member. A liquid spray system is provided for cooling components of the cutting apparatus.

19 Claims, 31 Drawing Sheets

(52) U.S. Cl.
CPC ..... *B23D 57/0053* (2013.01); *B23D 57/0069* (2013.01); *B23D 57/0084* (2013.01); *B23D 59/04* (2013.01); *Y10T 83/9292* (2015.04)

(58) Field of Classification Search
USPC ... 83/169, 452, 651.1, 72, 788, 100, 522.14, 83/581.1, 14, 56, 745, 794, 795, 796, 83/809, 810, 811–813, 820, 917, 661; 405/56, 154.1, 173, 158, 166; 451/294, 451/452, 454, 439, 296, 310; 30/92, 30/93–97, 380, 382–385; 125/12, 14, 125/16.1, 16.02, 21
See application file for complete search history.

(56) References Cited

U.S. PATENT DOCUMENTS

| | | | |
|---|---|---|---|
| 2,759,242 | A | 8/1956 | Goldman |
| 2,617,678 | A | 3/1965 | Kelso |
| 3,172,384 | A | 3/1965 | Tipton |
| 3,661,045 | A * | 5/1972 | Mermelstein ........ B23D 47/005 83/676 |
| 3,820,424 | A | 6/1974 | George |
| 3,958,332 | A | 5/1976 | Gates et al. |
| 4,091,533 | A | 5/1978 | Saumell |
| 4,212,104 | A | 7/1980 | Wikoff |
| 4,449,271 | A | 5/1984 | Karubian |
| 4,463,638 | A | 8/1984 | Fortin |
| H000045 | H | 4/1986 | Gilmore |
| 4,608,892 | A * | 9/1986 | Noizet ................... A22B 5/208 83/168 |
| 4,705,331 | A | 11/1987 | Britton |
| 4,766,790 | A * | 8/1988 | Harris ................... B23D 53/08 83/56 |
| 5,361,748 | A | 11/1994 | Matteucci |
| 5,363,558 | A | 11/1994 | Schroeder |
| 5,388,334 | A | 2/1995 | Halsey |
| 5,524,517 | A | 6/1996 | Robinson |
| 5,875,771 | A | 3/1999 | Plattner |
| 6,267,037 | B1 | 7/2001 | McCoy, Jr. et al. |
| 7,406,905 | B2 | 8/2008 | Lawler et al. |
| 7,645,093 | B1 | 1/2010 | Clark, II et al. |
| 7,922,424 | B2 | 4/2011 | Clark, II |
| 8,029,036 | B2 | 10/2011 | Kline et al. |
| 8,047,194 | B2 | 11/2011 | Rieger et al. |
| 8,109,693 | B1 | 2/2012 | Clark, II |
| 8,286,625 | B2 | 10/2012 | Jenkins |
| 8,465,227 | B1 | 6/2013 | Clark, II |
| 8,475,081 | B2 | 7/2013 | Clark, II et al. |
| 8,651,098 | B2 | 2/2014 | Shae et al. |
| 8,833,219 | B2 | 9/2014 | Pierce |
| 9,186,805 | B2 * | 11/2015 | Switatowy ......... B23D 57/0084 |
| 9,457,490 | B2 | 10/2016 | Öberg et al. |
| 9,827,624 | B2 | 11/2017 | Pierce |
| 9,889,575 | B2 | 2/2018 | Swiatowy et al. |
| 2004/0231654 | A1 | 11/2004 | Parsells |
| 2008/0022830 | A1 | 1/2008 | Lawler et al. |
| 2009/0314149 | A1 | 12/2009 | Clark, II |
| 2010/0186564 | A1 | 7/2010 | Pierce |
| 2010/0300195 | A1 | 12/2010 | Coulter |
| 2012/0174723 | A1 | 7/2012 | Matteucci |
| 2013/0061730 | A1 | 3/2013 | Swiatowy et al. |
| 2014/0144421 | A1 | 5/2014 | Chua |
| 2014/0157964 | A1 | 6/2014 | Davis |
| 2014/0352506 | A1 | 12/2014 | Harper et al. |
| 2015/0027287 | A1 | 1/2015 | Harper et al. |
| 2015/0101471 | A1 * | 4/2015 | Pierce ................ B23D 57/0038 83/522.14 |
| 2018/0065266 | A1 | 3/2018 | Swiatowy et al. |

FOREIGN PATENT DOCUMENTS

| | | |
|---|---|---|
| CN | 102046316 | 5/2011 |
| CN | 102067288 | 5/2011 |
| DE | 102004018672 | 11/2005 |
| EP | 0540834 | 5/2004 |
| EP | 1598161 | 11/2005 |
| GB | 2394694 | 5/2004 |
| JP | H01223294 | 9/1989 |
| JP | 07150775 | 6/1995 |
| JP | 2012135872 | 7/2012 |
| KR | 20090105764 | 10/2009 |
| KR | 2010027354 | 3/2010 |
| NO | 180185 | 3/1997 |
| SU | 1662866 | 7/1991 |
| WO | 2009/146294 | 12/2009 |

OTHER PUBLICATIONS

Australian Examination Report in connection with Australian Patent Application No. 2010206882 dated Apr. 9, 2014, 6 pages.
Database WPI, Week 199216, Thomson Scientific, London, GB; AN 1992-130534; XP00288559, & SU 1 662 866 A (Metsatunyants V E) Jul. 15, 1991 (Jul. 15, 1991) Abstract and machine translation.
European Patent Office, International Searching Authority, International Search Report and Written Opinion for PCT/US2012/058408, dated Dec. 19, 2012.
Machine translation of CN102046316A.
Machine translation of CN102067288.
Machine translation of CN200957639.
Machine translation of DE102004018672.
Machine translation of JP07150775.
Machine translation of JP2012135872.
Machine translation of JPH01223294.
Machine translation of KR20090105764.
Machine translation of the abstract for KR2010027354.

* cited by examiner

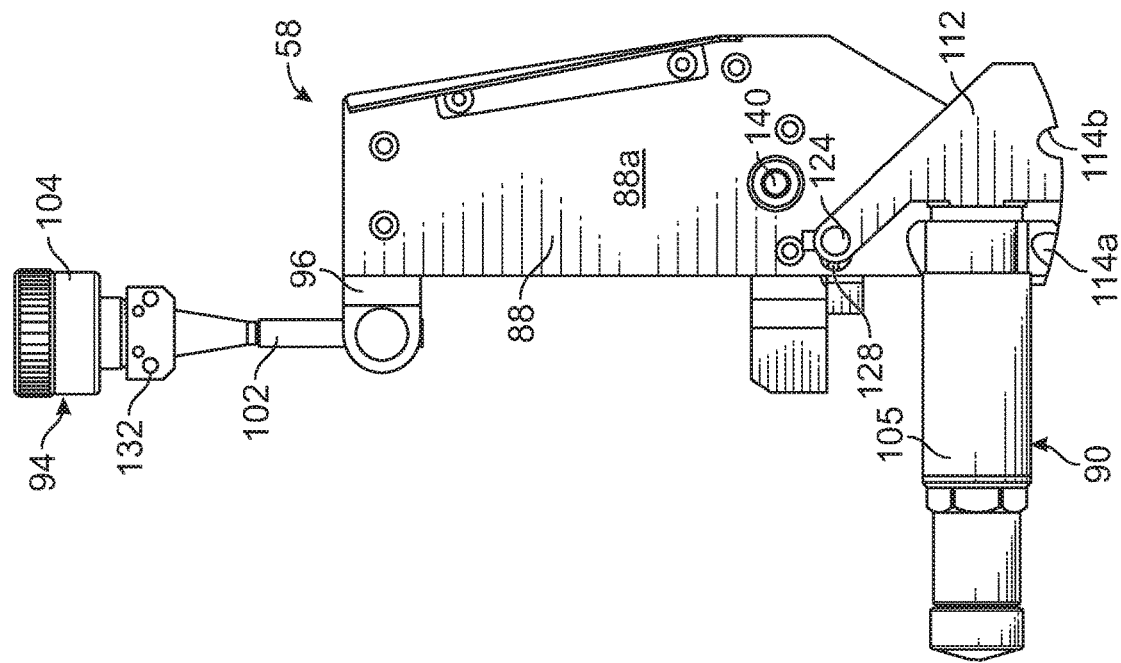
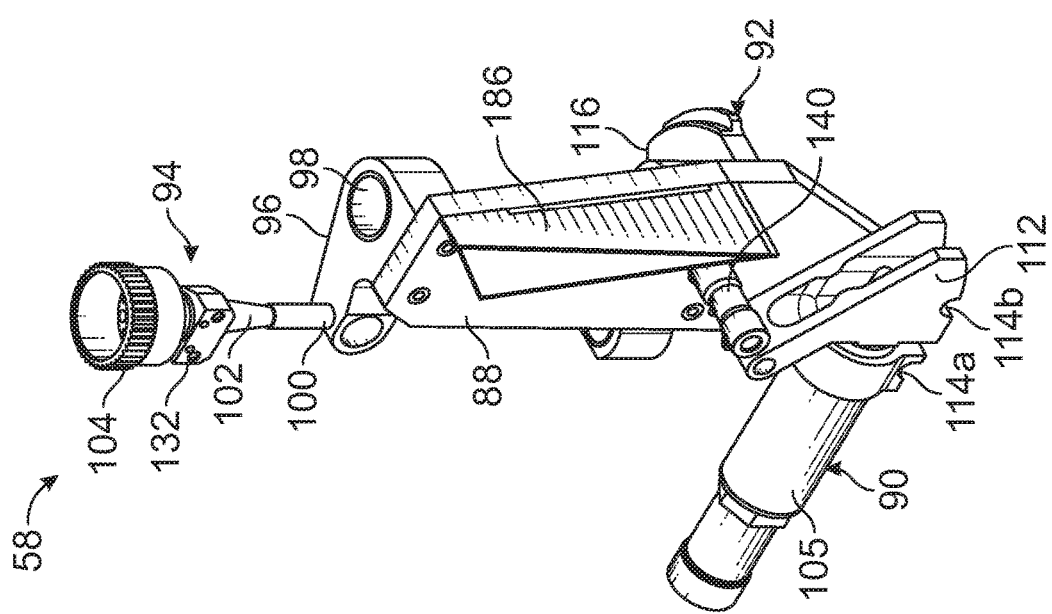

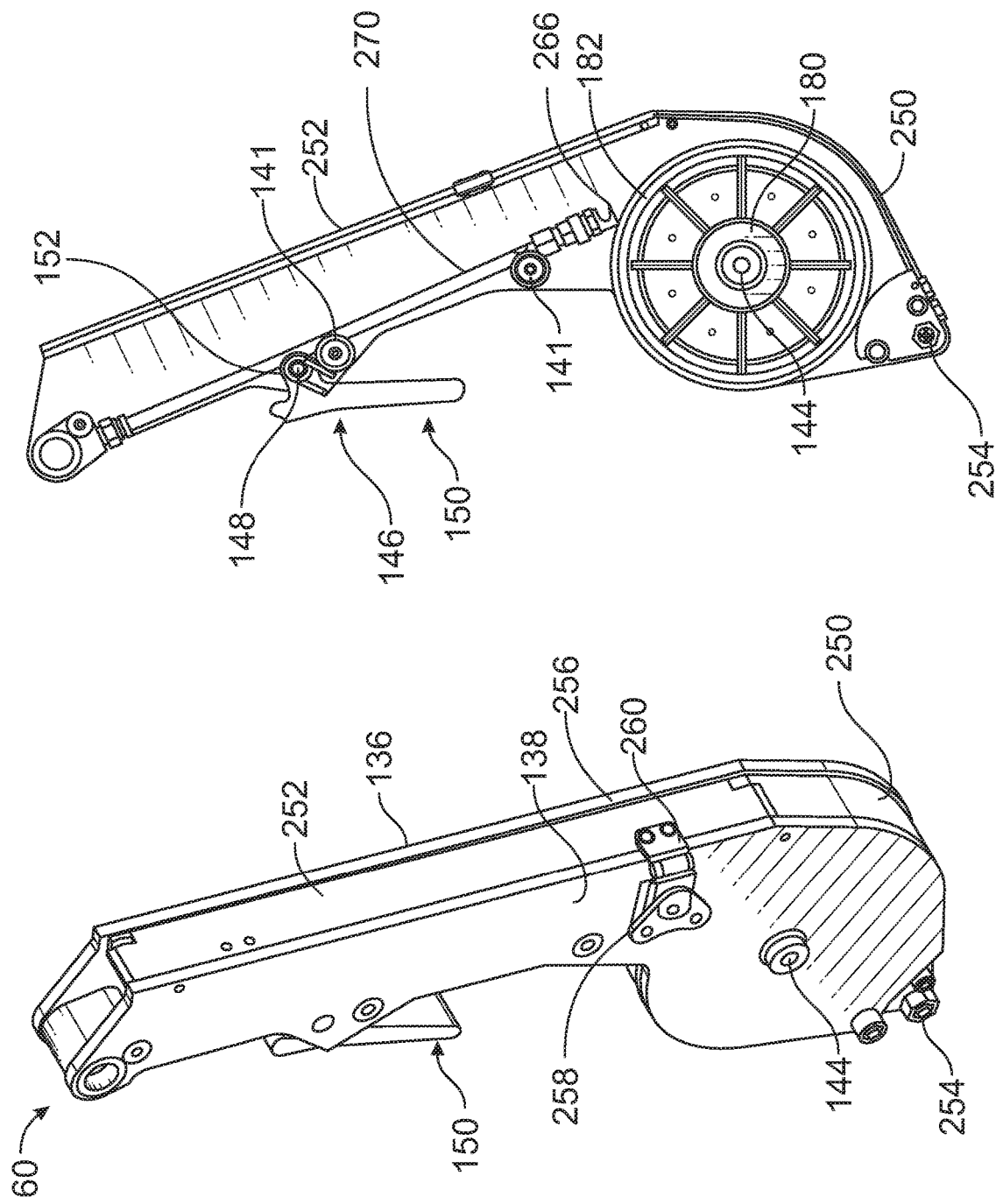

CUTTING APPARATUS INCLUDING A LIQUID SPRAY SYSTEM

RELATED APPLICATIONS

This application claims the benefit of priority to U.S. Provisional Application Ser. No. 62/517,275 filed Jun. 9, 2017, the specification of which is incorporated by reference herein in its entirety.

FIELD OF THE DISCLOSURE

The present disclosure generally relates to cutting apparatuses and, more particularly, to cutting apparatuses including wire cutting members for cutting objects, such as pipes.

BACKGROUND

Cutting apparatuses including a wire for cutting products are generally referred to as wire saws. Wire saws are bulky items and may be unsafe to operate. The bulky wire saws are limited in the environments in which they may be operated and consume large spaces when not in use. Moreover, wire saws may not adequately couple to pipes or the operator may operate the wire saw in an unsafe position, thereby putting the operator in danger when operating the wire saws.

SUMMARY

The present disclosure is defined by the following claims, and nothing in this section should be taken as a limitation on those claims.

It is therefore desirable to have a cutting apparatus including a wire cutting member that is compact and safe to operate. A wire saw that is compact will be utilized in more environments and a safe wire saw will decrease exposure of the operator to danger while operating the wire saw.

In one aspect, a cutting apparatus is provided.

In one aspect, a method of cutting an object is provided.

In one aspect, a cutting apparatus is provided and is moveable between a first position and a second position, and the cutting apparatus is more compact in the first position than in the second position.

In one aspect, a cutting apparatus is provided and includes a water spray system.

In one aspect, a cutting apparatus is provided and includes a feed tower assembly configured to be attached to an object and a frame assembly movably attached thereto. The frame assembly has arm assemblies thereon which accept a cutting member. At least one arm assembly can be pivoted relative to the other arm assembly and relative to the feed tower assembly. One arm assembly can further be moved relative to the other arm assembly and relative to the feed tower assembly in a vertical direction.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 14 is a top, front perspective view of a wire tensioning assembly of the cutting apparatus;

FIG. 15 is a front elevation view of the wire tensioning assembly;

FIG. 20 is a top, front perspective view of a right arm assembly of the cutting apparatus;

FIG. 21 is a front elevation view of the right arm assembly with an arm plate removed;

DETAILED DESCRIPTION

Figure 1:
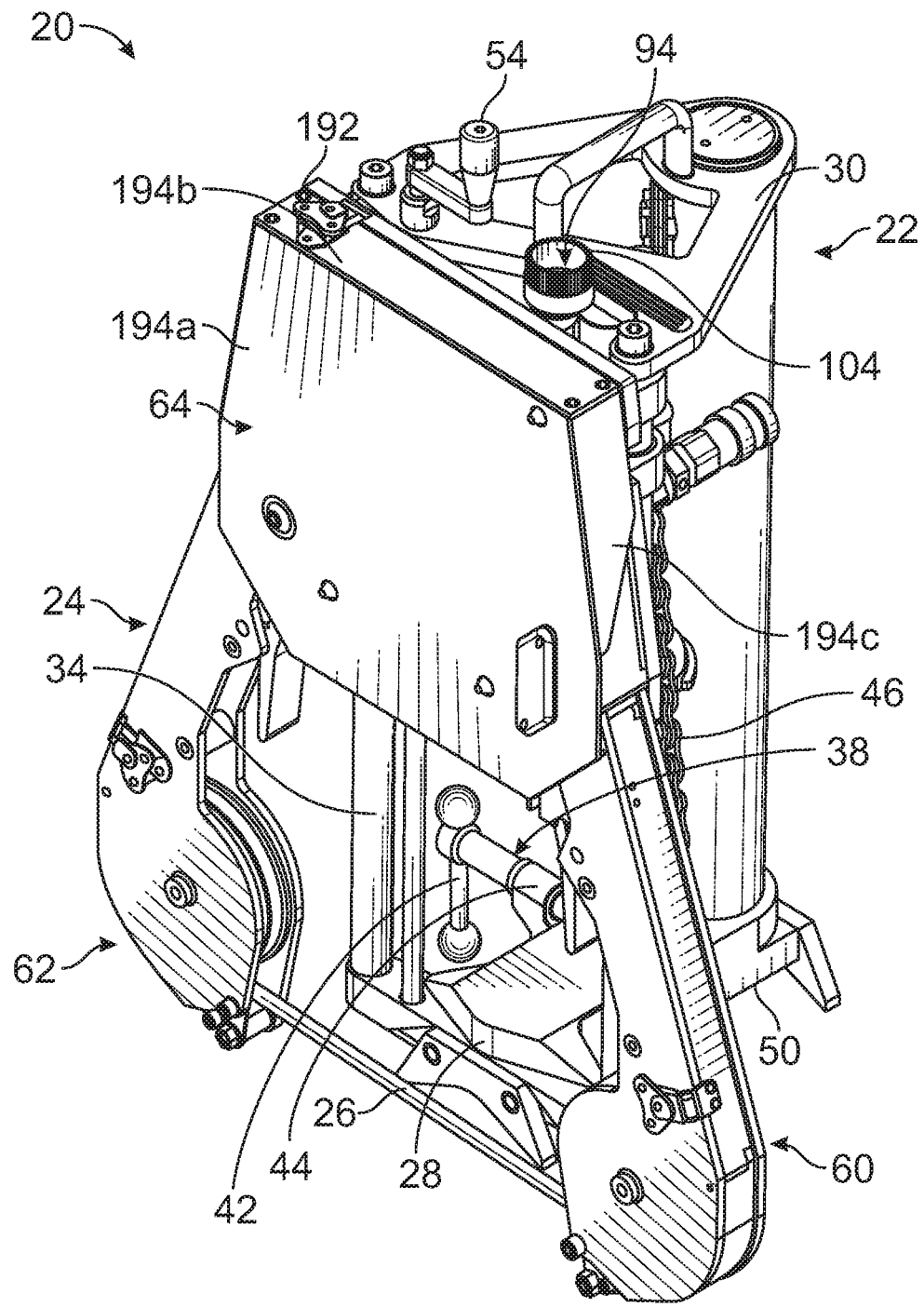
FIG. 1 is a top, front perspective view of one example of a cutting apparatus with the cutting apparatus shown in an operating position, according to one aspect of the present disclosure.
Figure 2:
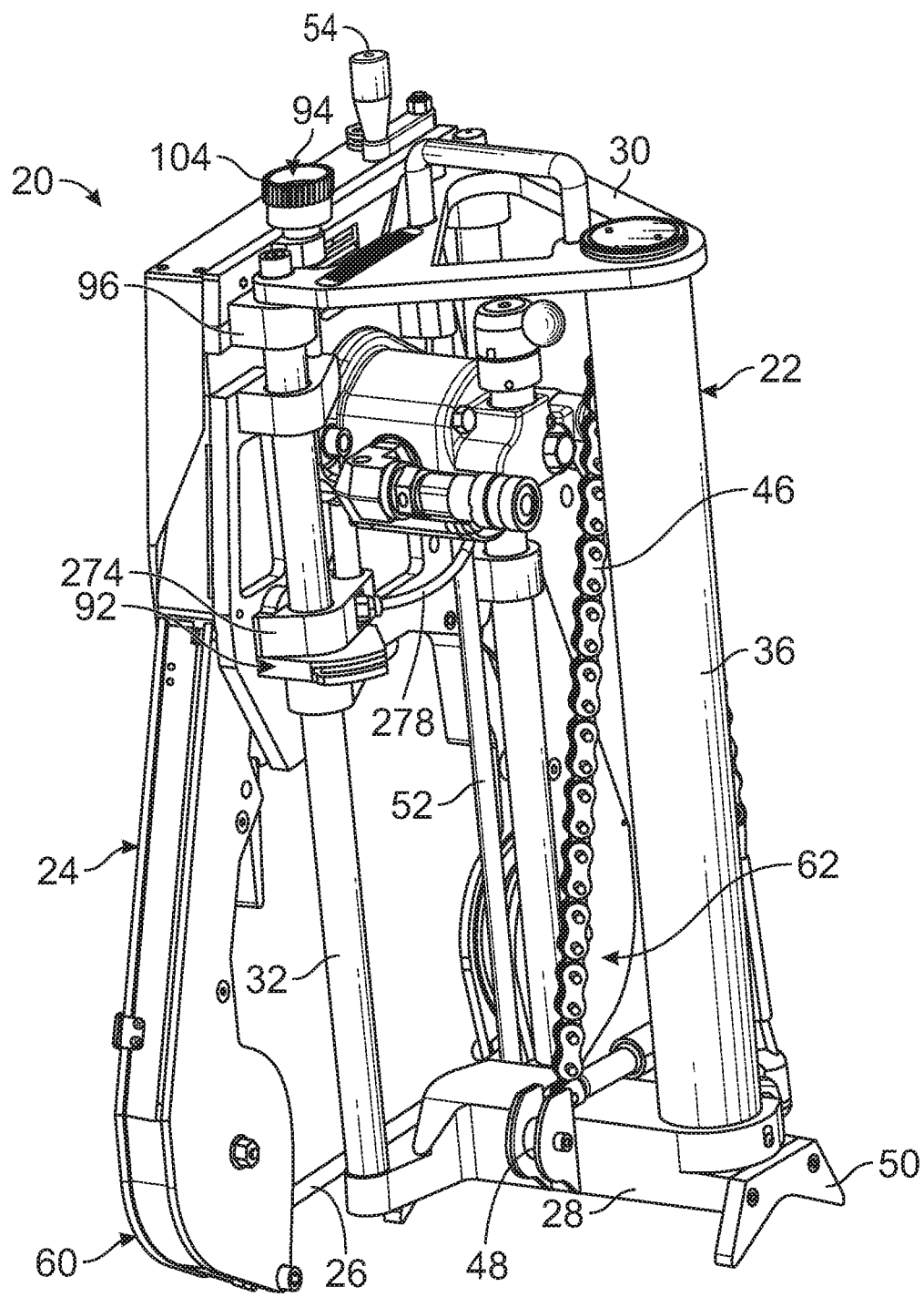
FIG. 2 is a top, rear perspective view of the cutting apparatus.
Figure 3:
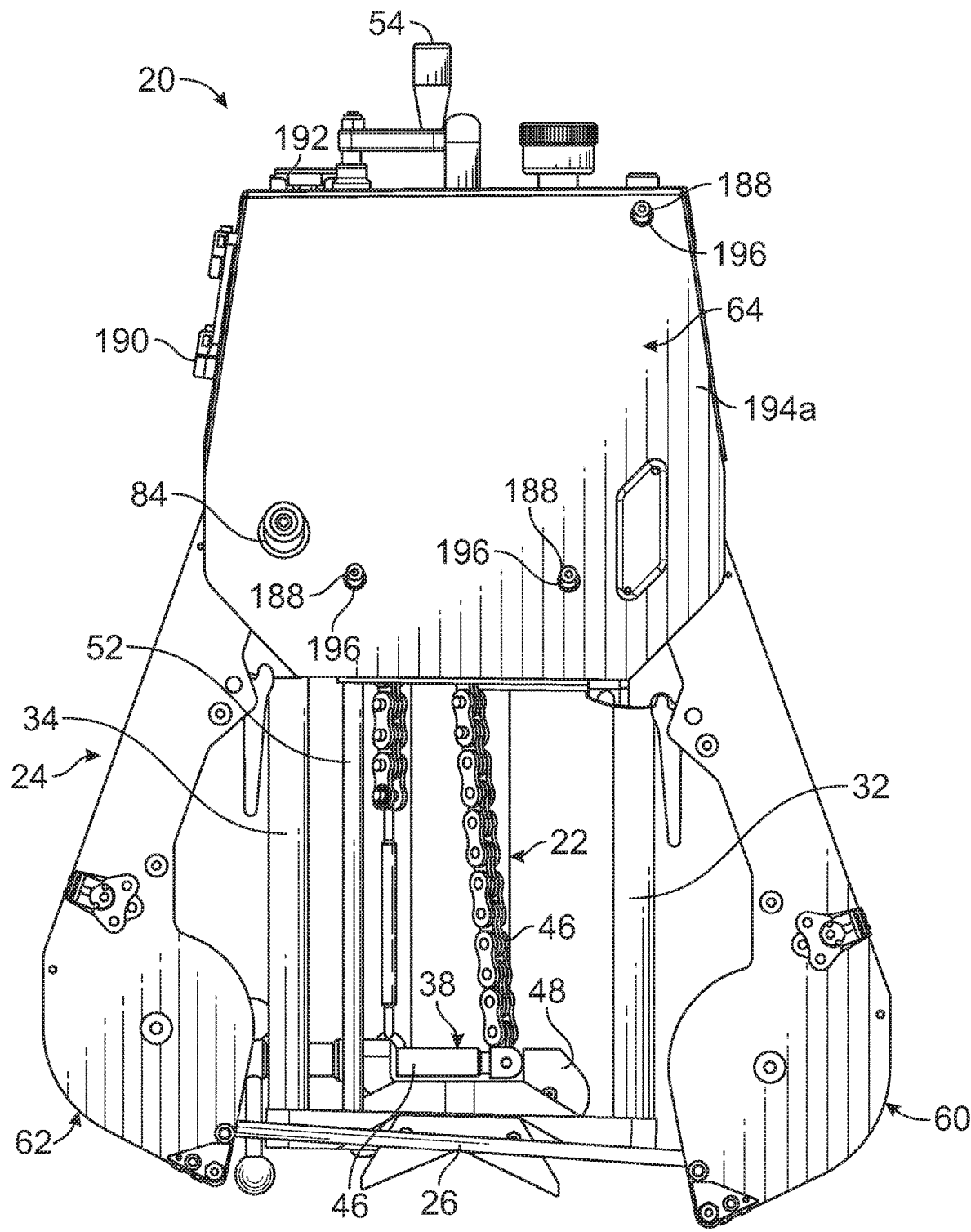
FIG. 3 is a front elevation view of the cutting apparatus.
Figure 4:
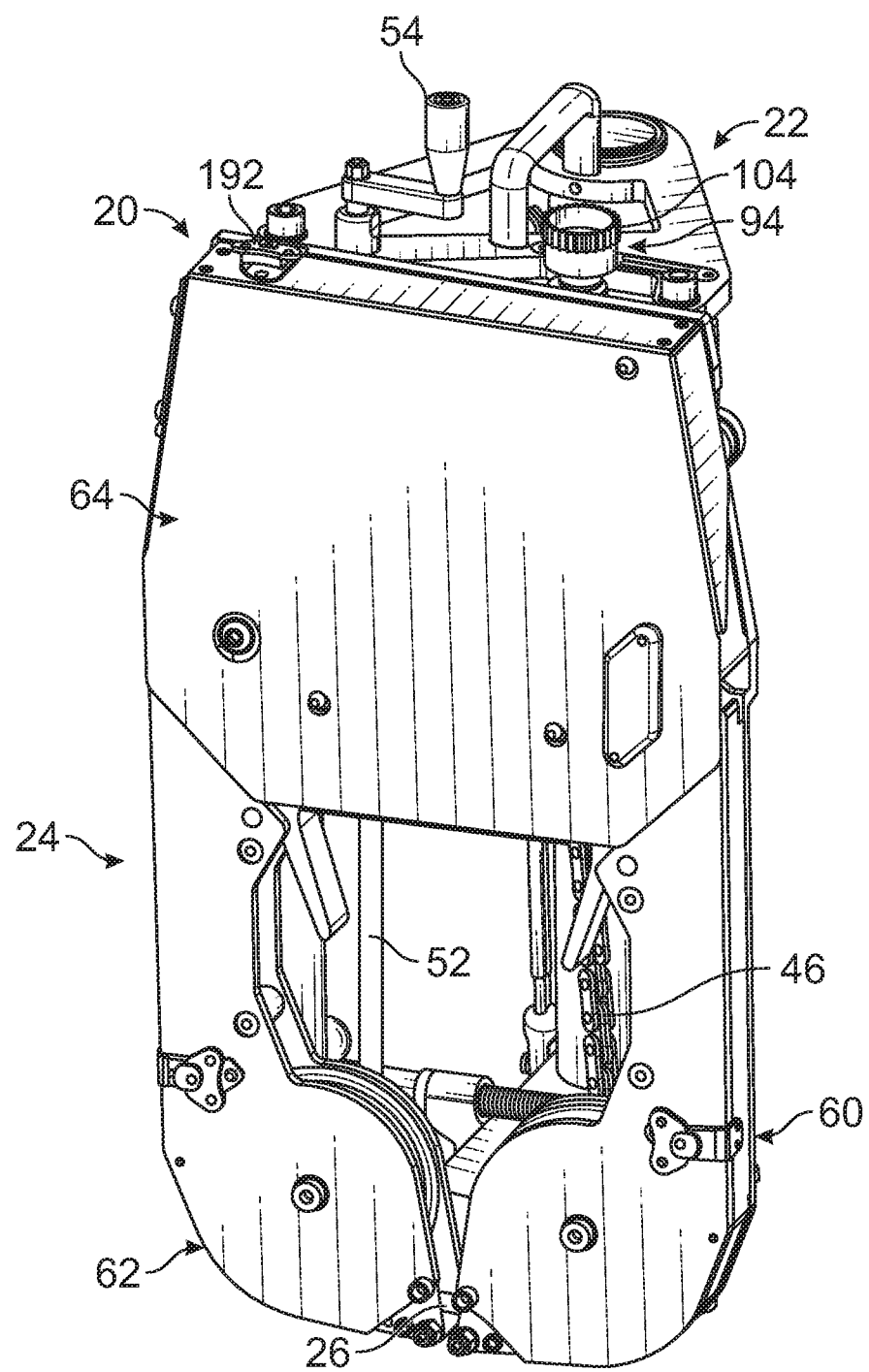
FIG. 4 is a top, front perspective view of the cutting apparatus with the cutting apparatus shown in a storage position, according to one aspect of the present disclosure.
Figure 5:
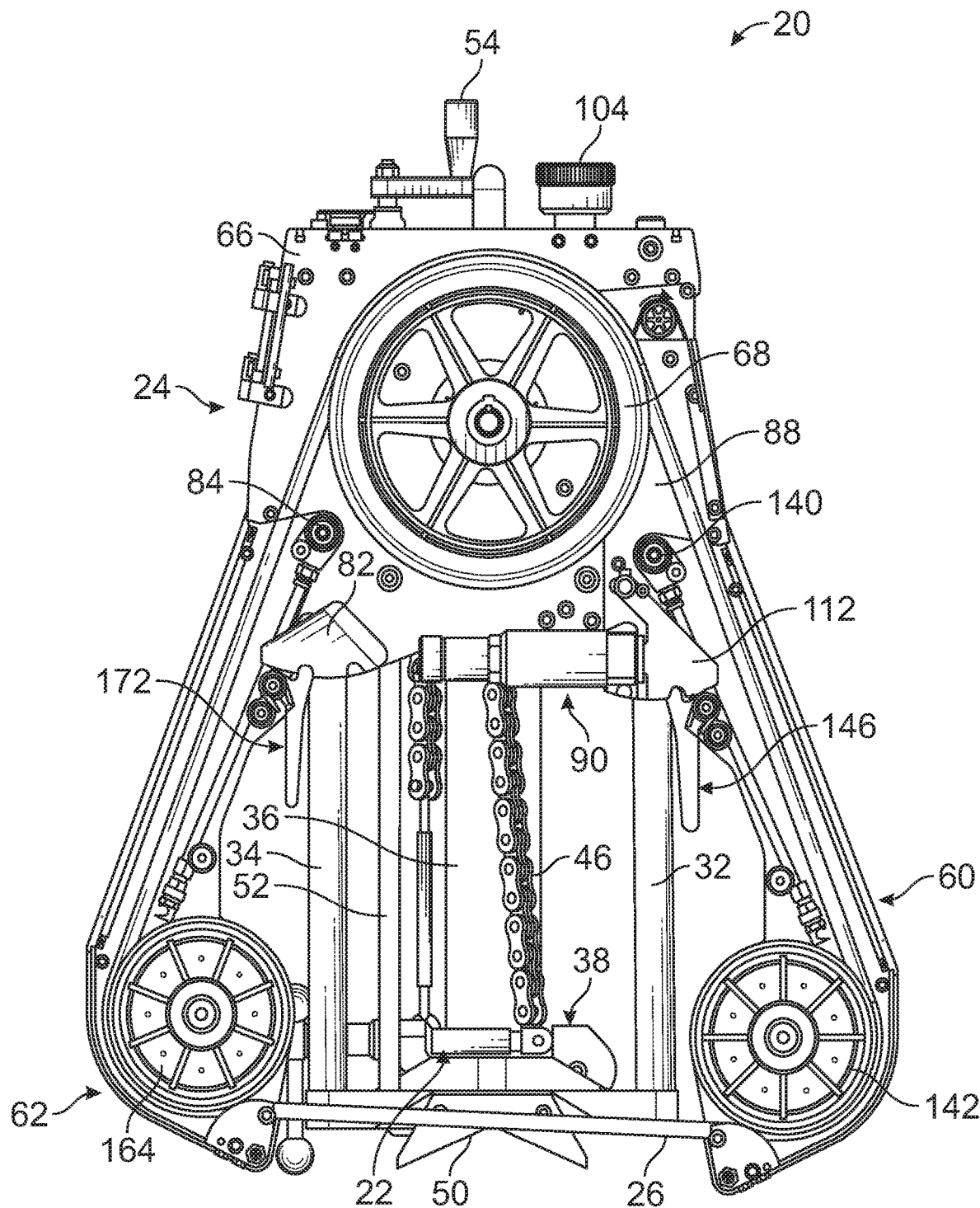
FIG. 5 is a front elevation view of the cutting apparatus with the cutting apparatus shown in the operating position and with a cover of the cutting apparatus removed.
Figure 6:
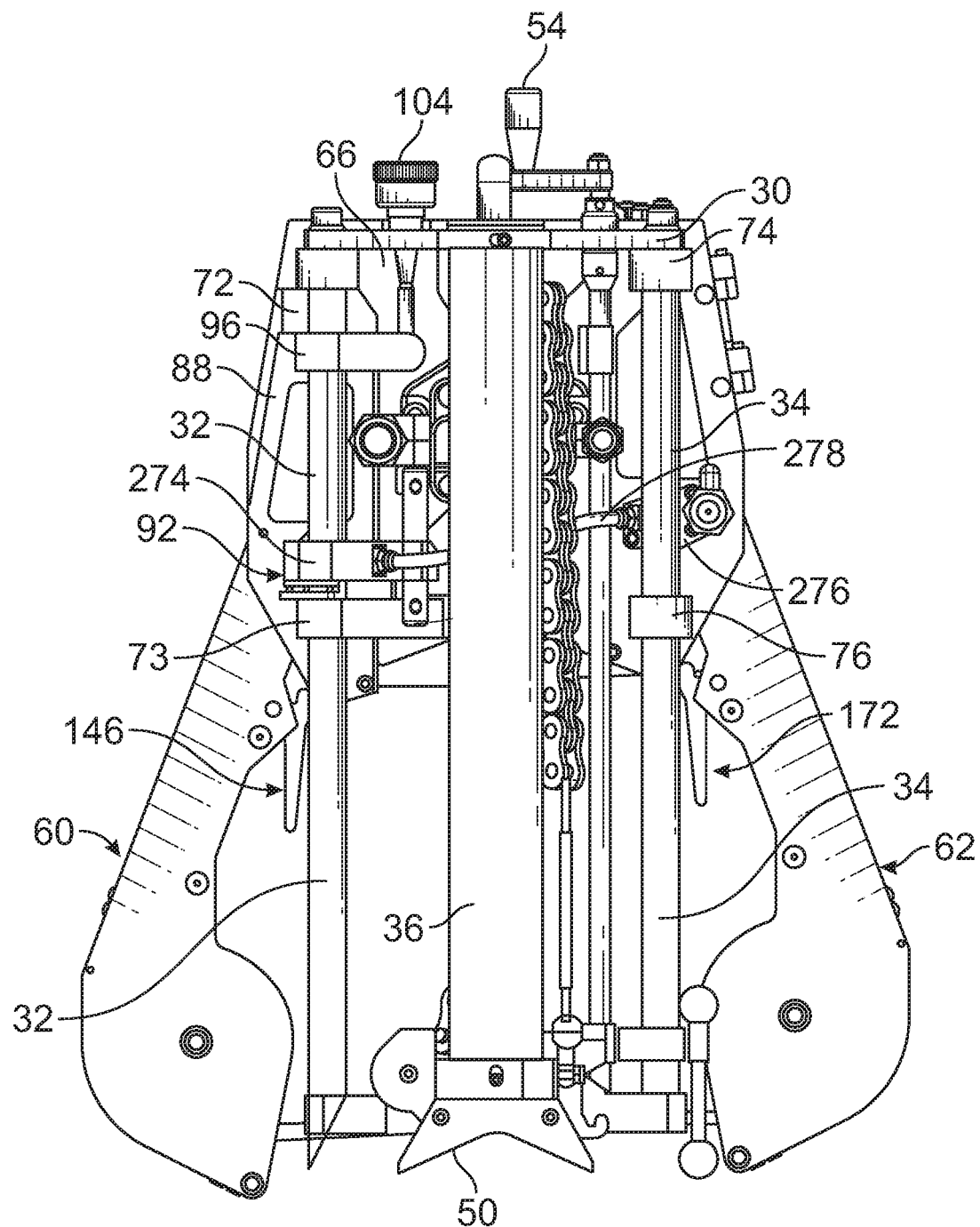
FIG. 6 is a rear elevation view of the cutting apparatus.

Referring to the figures, an example of a cutting apparatus 20 is shown. The cutting apparatus 20 may also be referred to as a wire saw. In this example, the cutting apparatus 20 is moveable between a first or operating position (see FIGS. 1-3) and a second, inoperable or storage position (see FIG. 4). When the cutting apparatus 20 is in the operating position, the cutting apparatus 20 is capable of cutting an object. The cutting apparatus 20 is adapted to cut a wide variety of objects. In one aspect, the cutting apparatus 20 is adapted to cut a cylindrical, hollow pipe. In such an example, the cutting apparatus 20 may cut a variety of different diameter pipes. For example, the cutting apparatus 20 may be able to cut a pipe having an outer diameter of up to about 9.6 inches.

In the storage position, the cutting apparatus 20 is very compact and can be introduced into a lot of small or tight environments that conventional cutting apparatuses or wires saws could not be introduced into and, therefore, could not be utilized. Thus, the compactness of the cutting apparatus 20 allows it to be utilized in a vast quantity of additional environments. In one example, the compactness of the cutting apparatus 20 allows the cutting apparatus 20 to pass into and through a manhole in a ground in order to access subterranean environments. Conventional cutting apparatuses and wire saws may not fit through a manhole, thereby precluding such conventional cutting apparatuses and wires saws from being used in subterranean environments.

The cutting apparatus 20 has a compact size and shape in both the operating position and in the storage position. In the illustrated example, the cutting apparatus 20 has a width W of about 12 inches, a depth D of about 12 inches, and a height H of about 29 inches in the storage position. The cutting apparatus 20 with these dimensions will be able to easily fit into tight or small spaces such as, for example, through a manhole in the ground. These illustrated dimensions of the cutting apparatus 20 are only an example of a variety of possible dimensions and are not intended to limit the present disclosure. Rather, the cutting apparatus 20 is capable of having other dimensions in the storage position, but still enable the cutting apparatus 20 to be compact and fit into and through small or tight environments. All of such dimensional possibilities of the cutting apparatus 20 are intended to be within the spirit and scope of the present disclosure.

Figure 7:
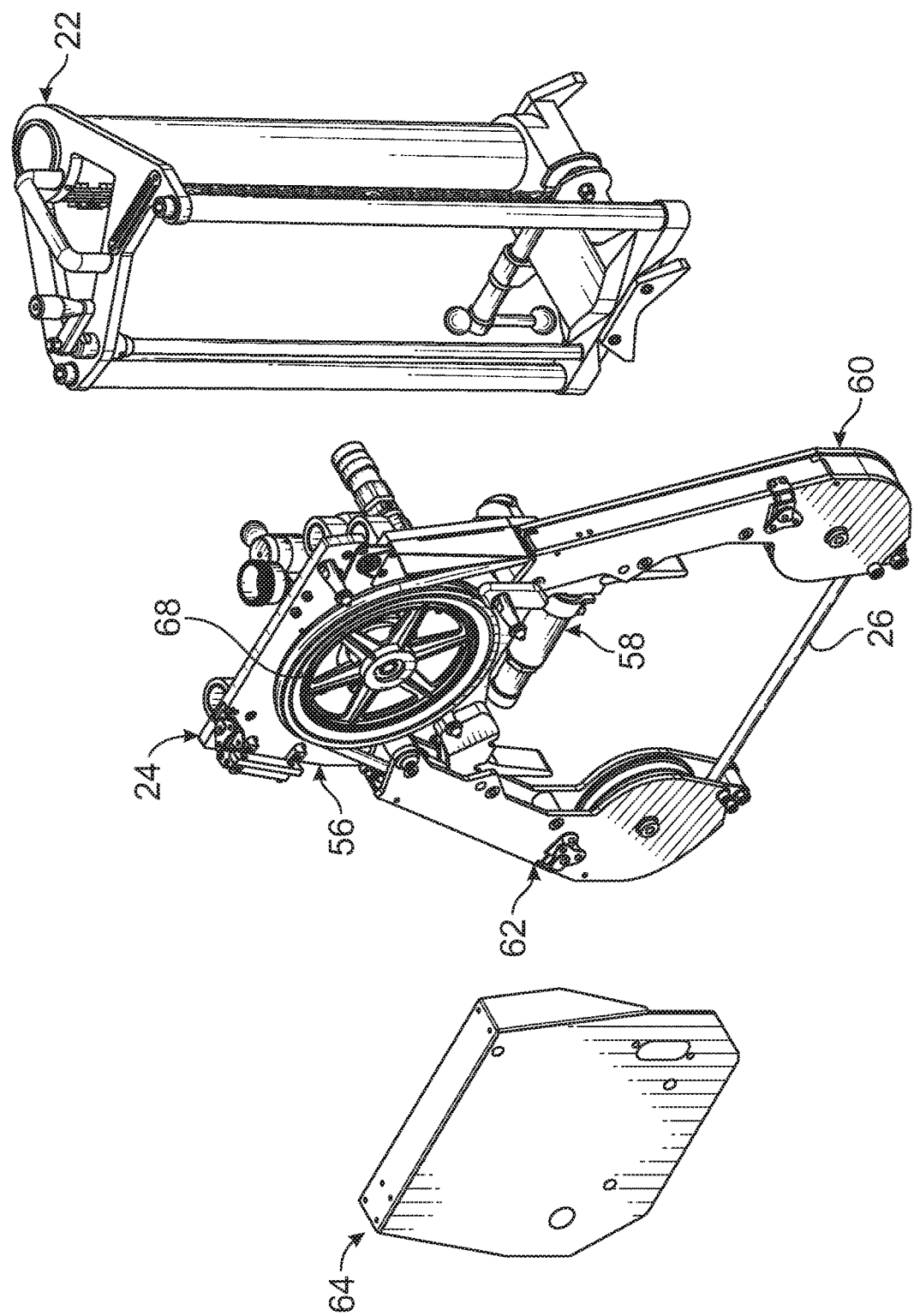
FIG. 7 is a top, front, exploded perspective view of the cutting apparatus with the cutting apparatus shown in the operating position.

The cutting apparatus 20 includes a feed tower assembly 22 which affixes to an object (not shown) to be cut, such as a pipe, and is stationary relative to the object, a frame assembly 24 which movable relative to the feed tower assembly 22, and a cutting member 26 removably attached to the frame assembly 24, see FIG. 7. In the illustrated example, the cutting member 26 is a wire. In one example, the cutting member 26 may be a braided wire with diamond particles on an exterior thereof. The wire cutting member 26 may be a wide variety of lengths and all of such possibilities are intended to be within the spirit and scope of the present disclosure. In one example, it is a feature of the cutting apparatus 20 to include a wire cutting member of about 95 inches to about 105 inches. The cutting apparatus 20 of the present disclosure is capable of accommodating a wire cutting member 26 of such lengths due to its construction (described in more detail below).

Figure 8:
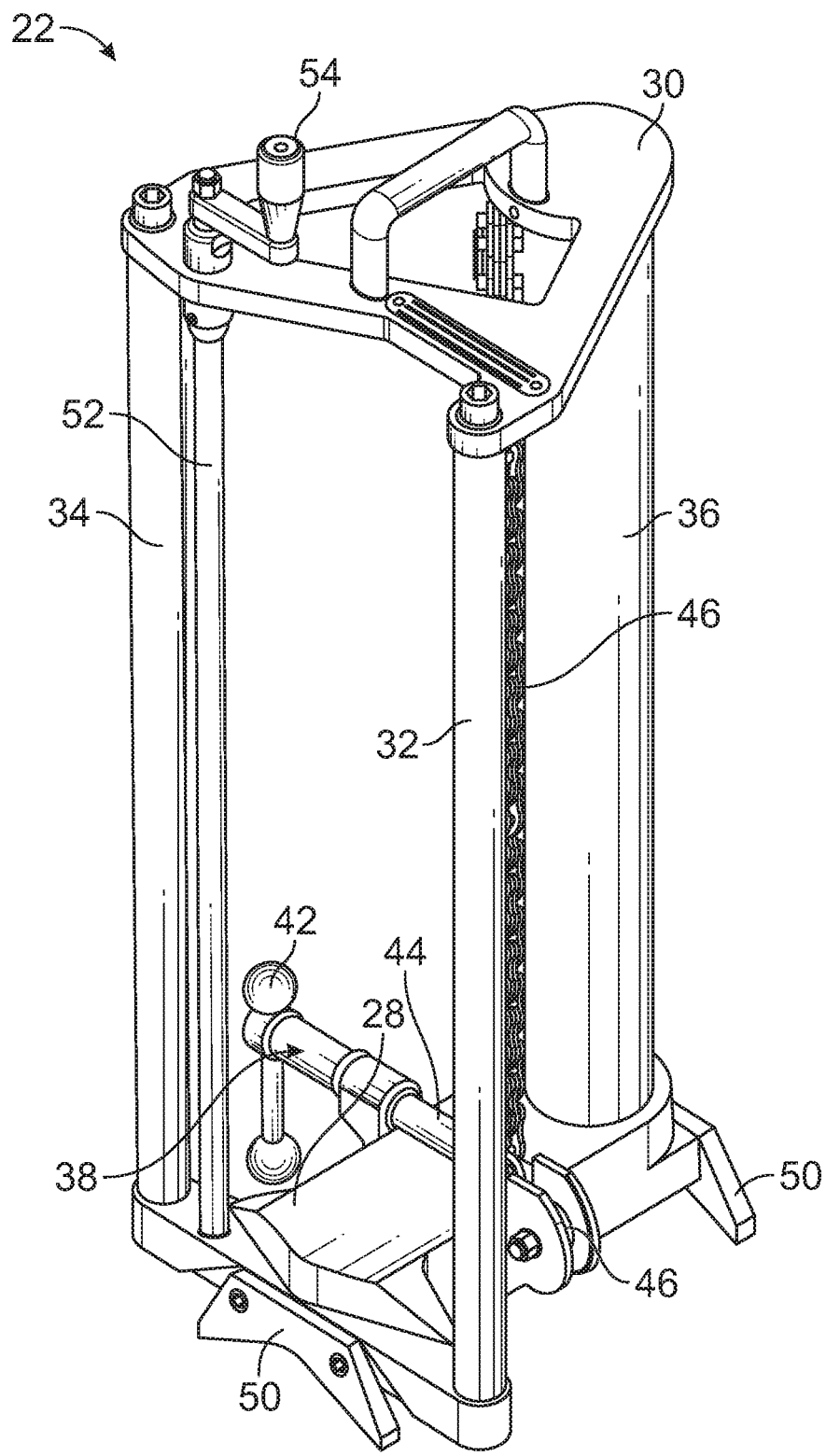
FIG. 8 is a top, front perspective view of a feed tower assembly of the cutting apparatus.
Figure 9:
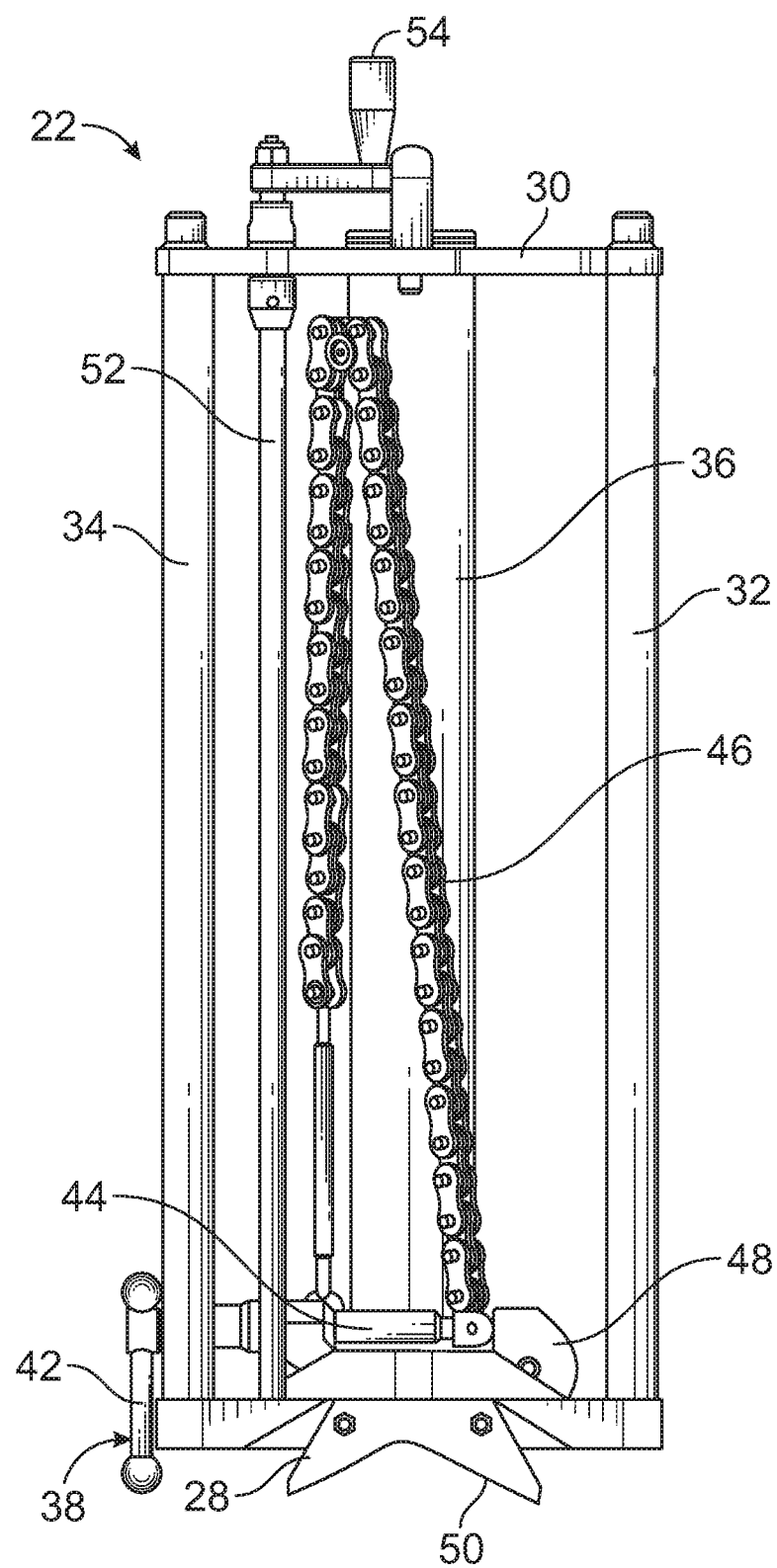
FIG. 9 is a front elevation view of the feed tower assembly.
Figure 10:
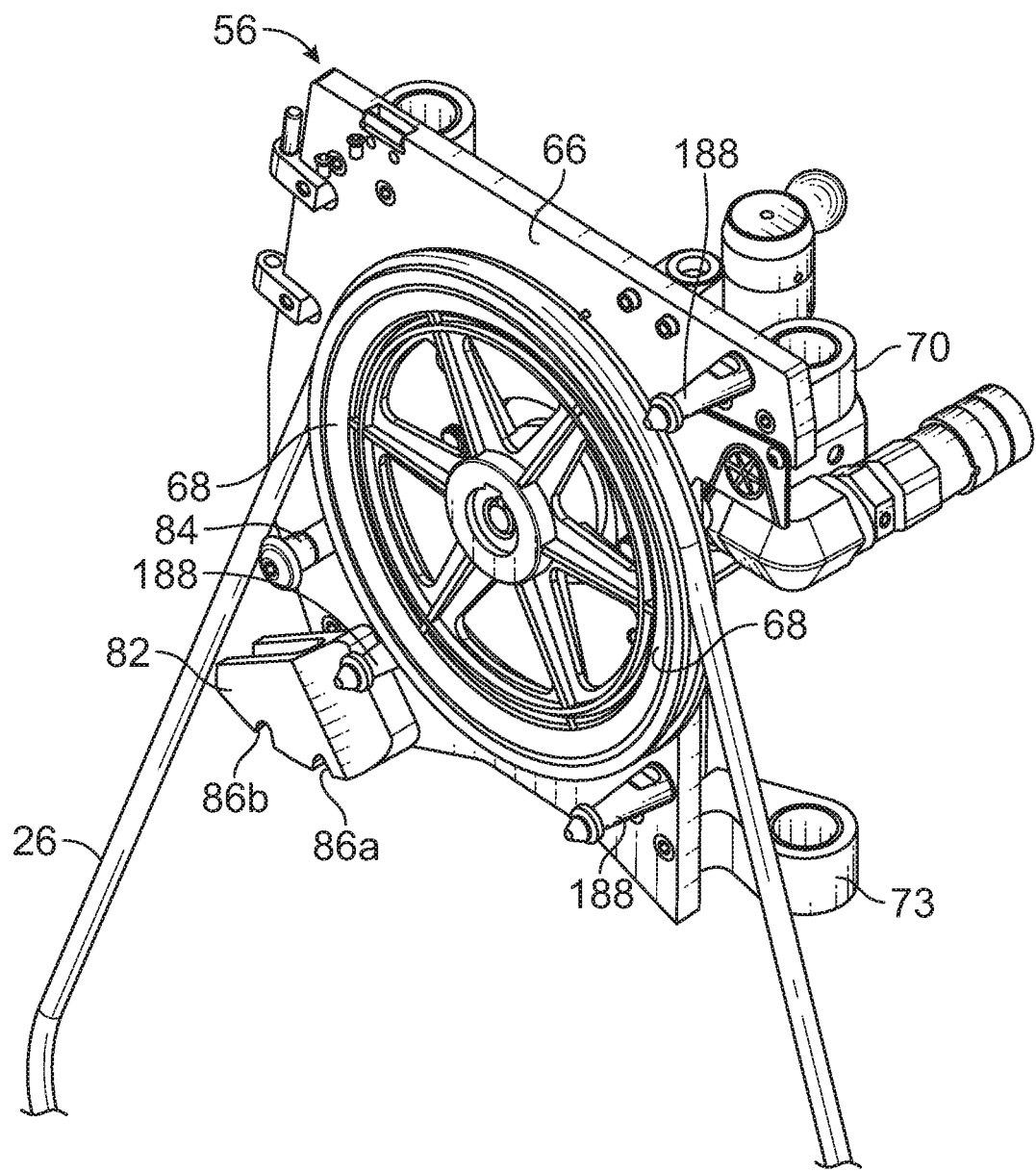
FIG. 10 is a top, front perspective view of a frame base plate assembly and a cutting member of the cutting apparatus, with the cover removed.
Figure 11:
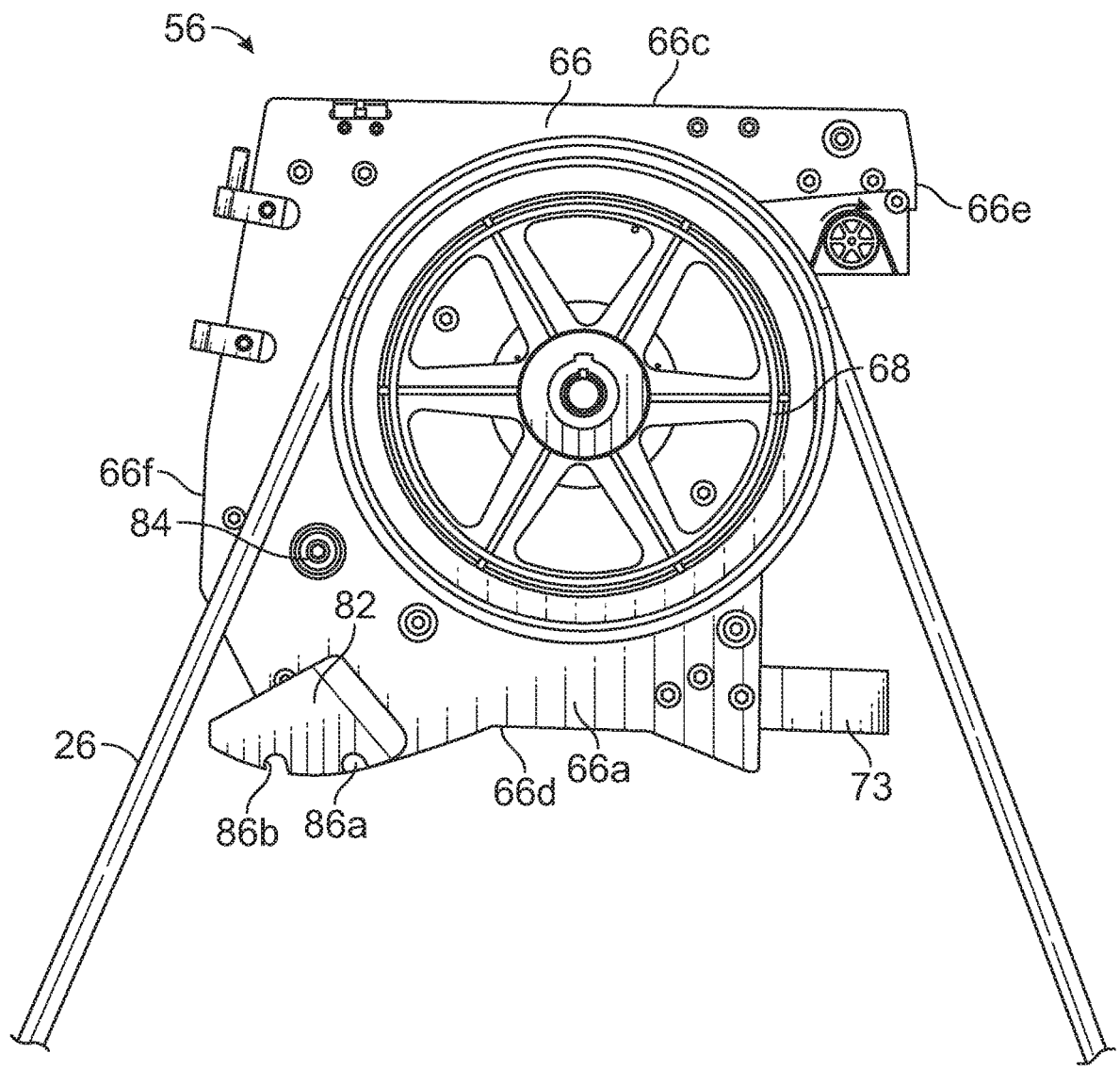
FIG. 11 is a front elevation view of the frame base plate assembly and the cutting member of the cutting apparatus, with the cover removed.
Figure 12:
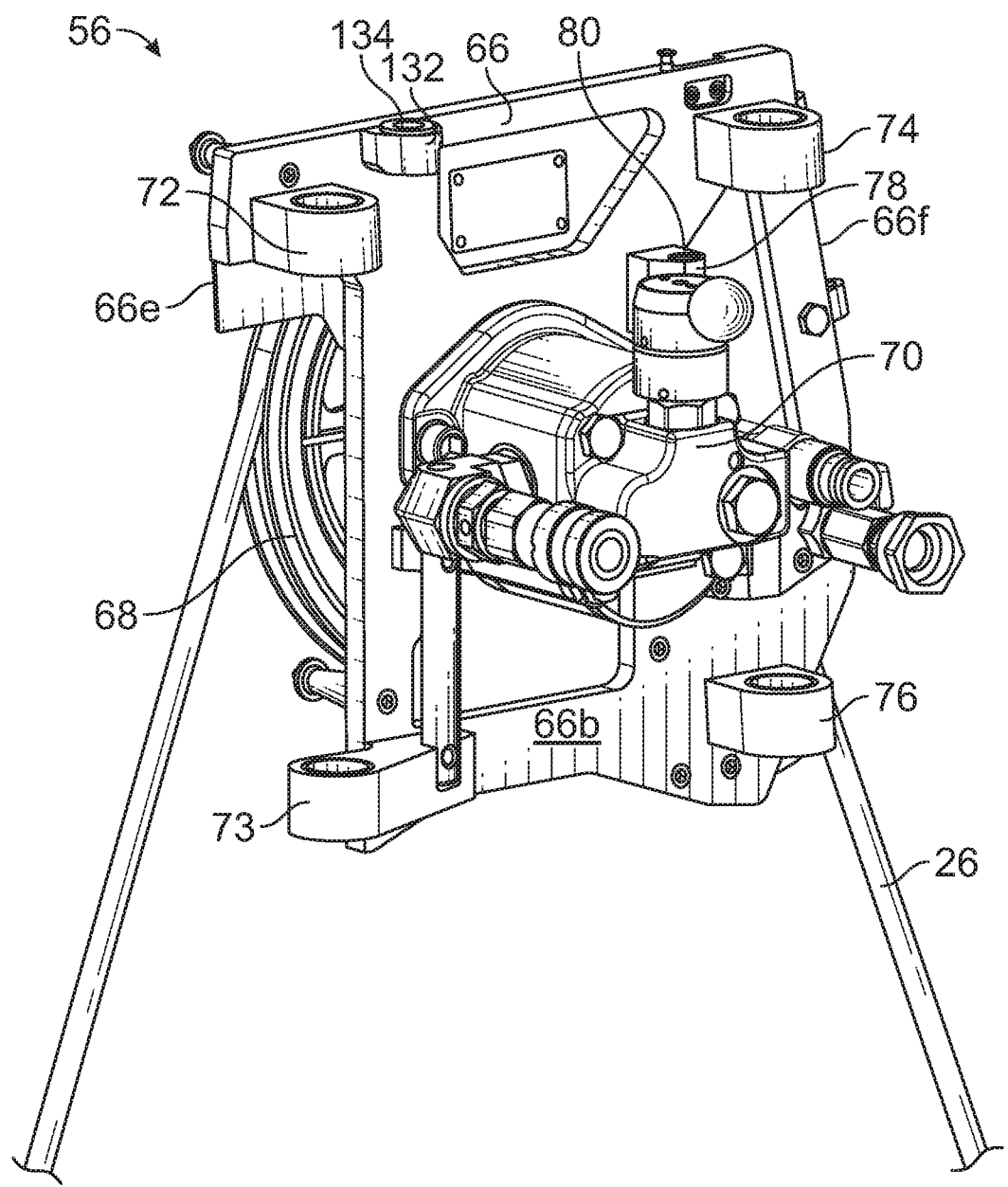
FIG. 12 is a top, rear perspective view of the frame base plate assembly and the cutting member of the cutting apparatus, with the cover removed.
Figure 13:
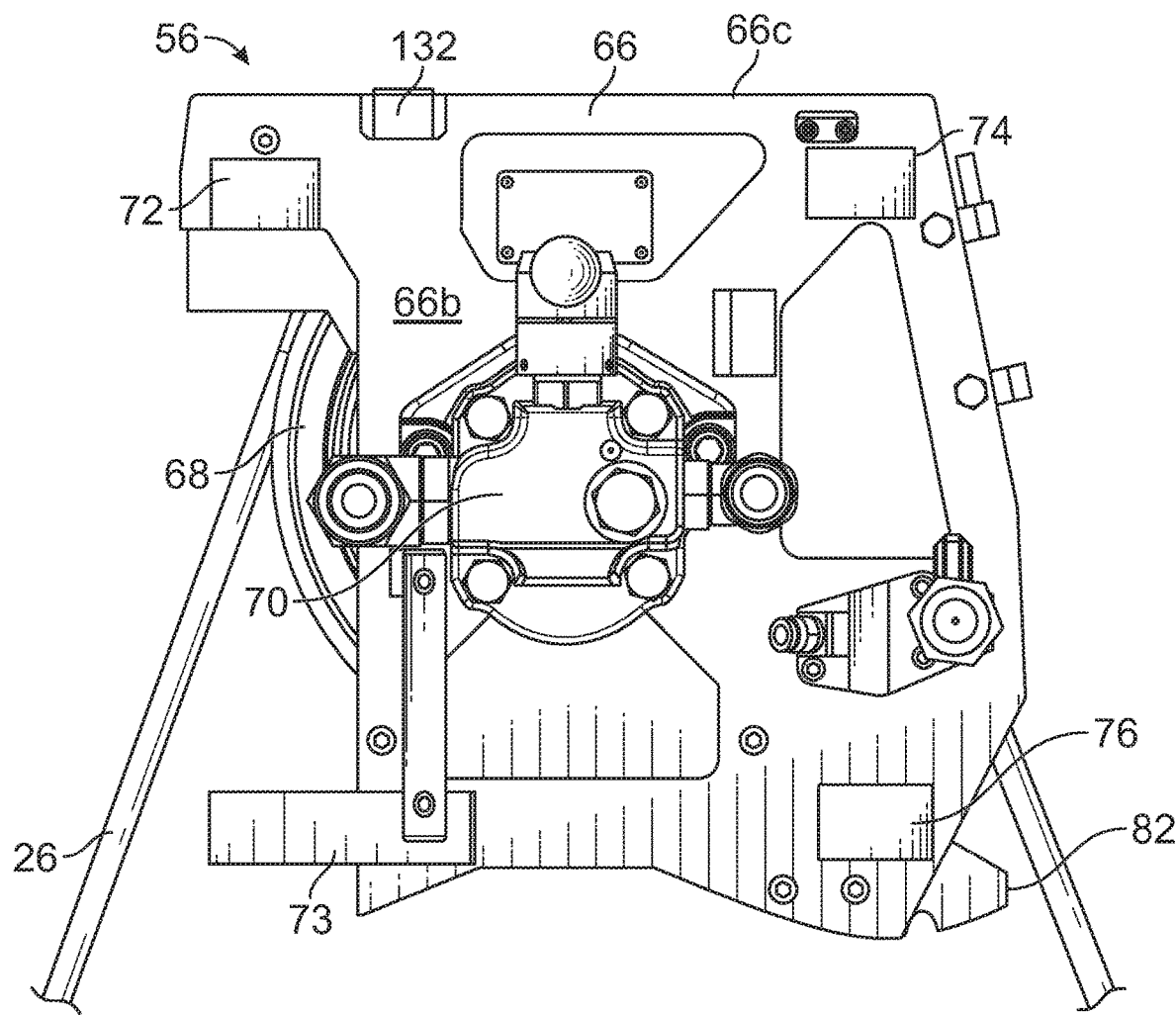
FIG. 13 is a rear elevation view of the frame base plate assembly and the cutting member of the cutting apparatus, with the cover removed.
Figure 16:
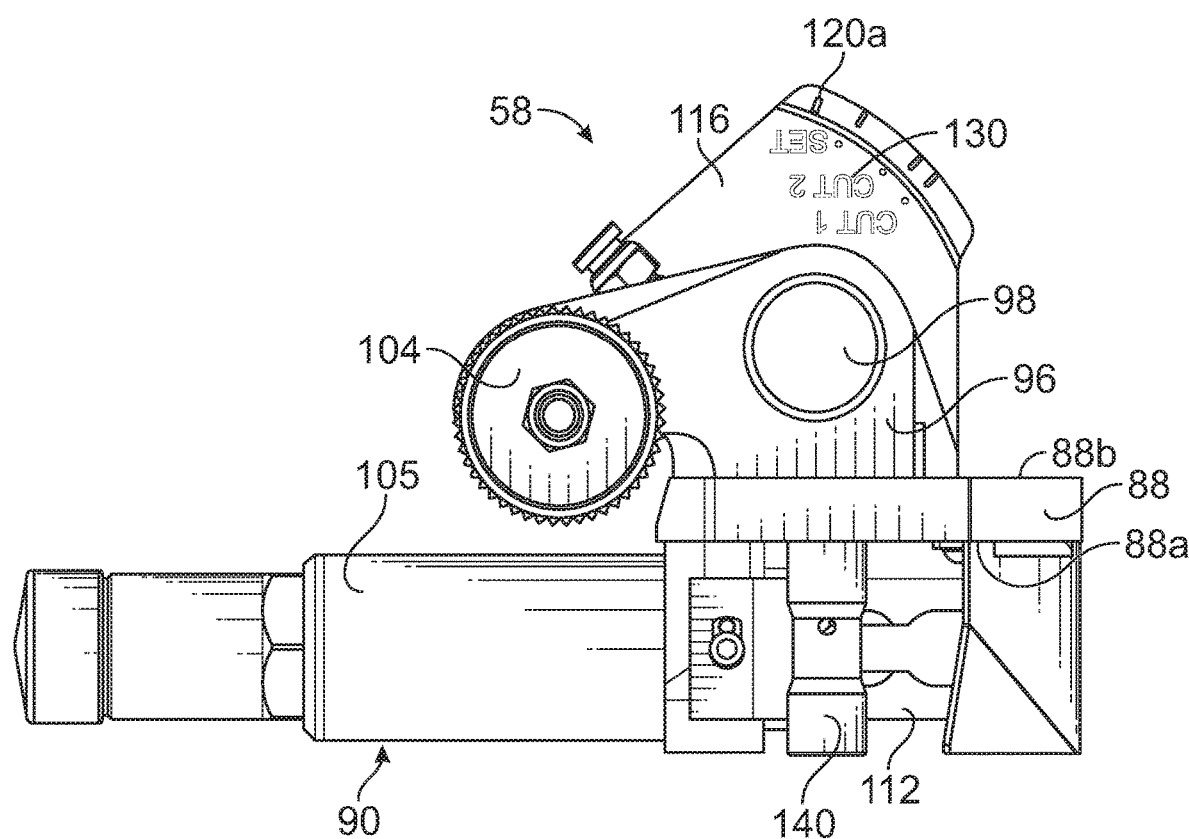
FIG. 16 is a top plan view of the wire tensioning assembly.
Figure 17:
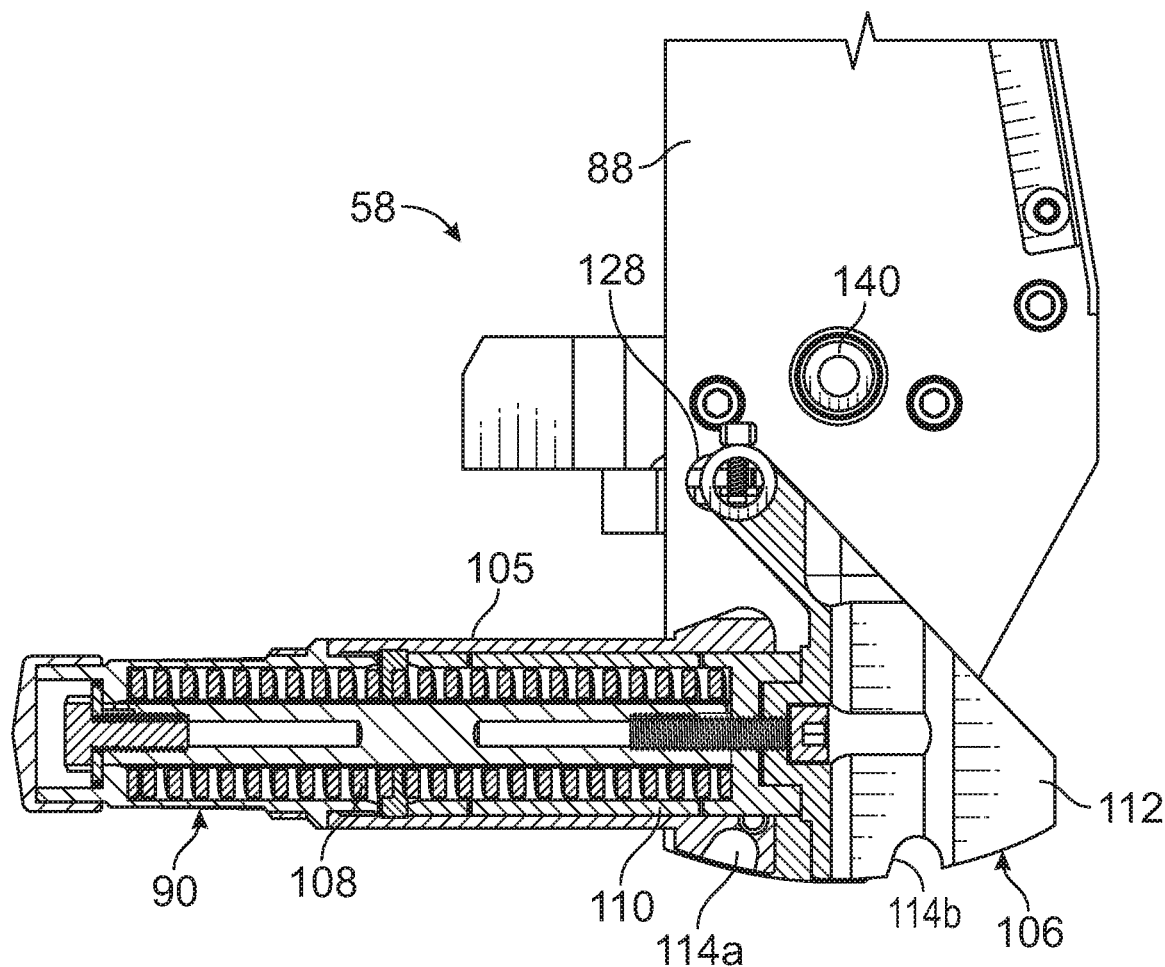
FIG. 17 is a cross-sectional view of the wire tensioning assembly.
Figure 18:
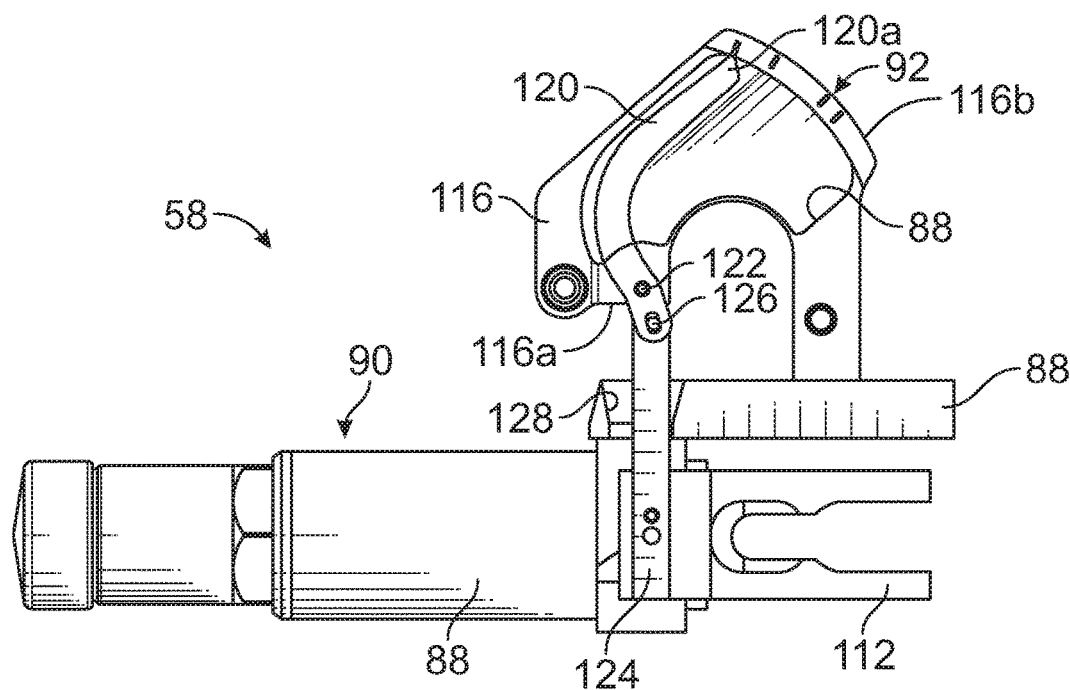
FIG. 18 is a cross-sectional view of the wire tensioning assembly.
Figure 19:
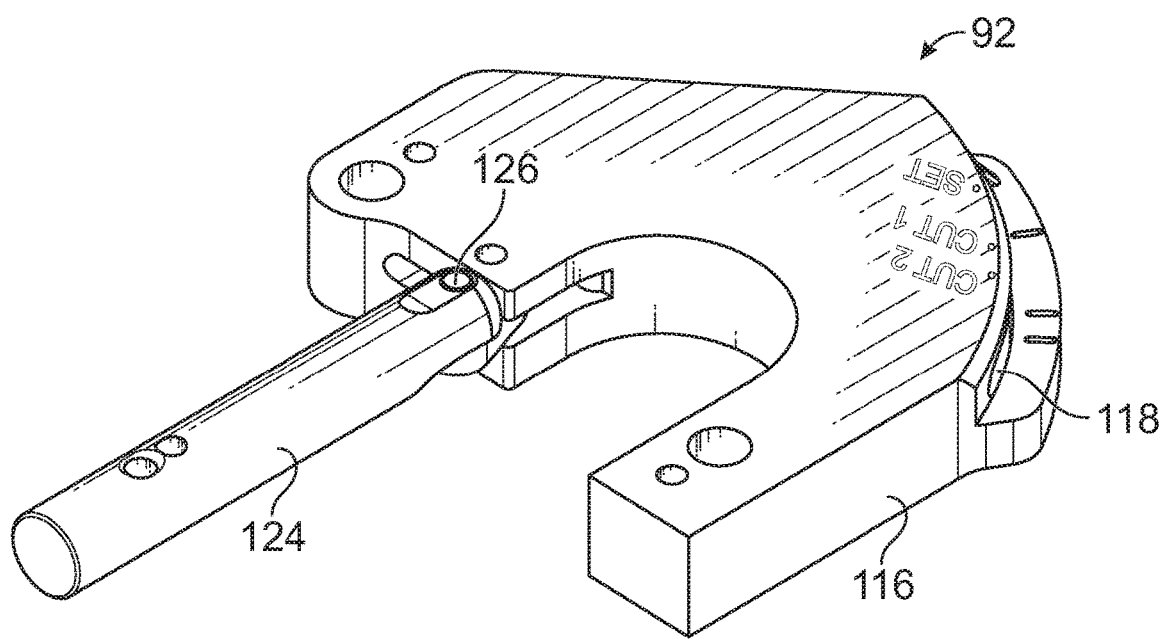
FIG. 19 is a top, front perspective view of a tension indicator mechanism of the cutting apparatus.

The feed tower assembly 22 is best shown in FIGS. 8 and 9 and includes a lower saddle 28, an top guide plate 30, a pair of guide shafts 32, 34 extending between and coupled to the lower saddle 28 and the top guide plate 30, a feed tower tube 36 extending between and coupled to the lower saddle 28 and the top guide plate 30, a coupling assembly 38 for coupling the feed tower assembly 22 to the object, and a frame height adjustment mechanism 40 which is configured to move the frame assembly 24 relative to the feed tower assembly 22 to cut the object.

The cutting apparatus 20 may include a variety of different coupling assemblies to couple the cutting apparatus 20 to an object. The coupling assembly 38 includes a handle 42, a connector 44, a wrapping member 46, and an engagement surface 48. The wrapping member 46 is selectively wrapped around an object, such as a pipe, and connected to the connector 44. The wrapping member 46 may be a wide variety of wrapping members 46 such as, for example a chain, a strap, etc. Rotation of the handle 42 causes the connector 44 to translate toward or away from the handle 42 depending on the direction of rotation. Translating the connector 44 toward the handle 42 tightens the wrapping member 46 around the object. The engagement surface 48 is arcuate or curved and is engaged by the wrapping member 46. The arcuate engagement surface 48 assists with equal tightening forces being applied to the object to which the cutting apparatus 20 is attached no matter the size or diameter of the object. Moreover, the arcuate engagement surface 48 ensures the wrapping member 46 extends therefrom at a proper angle that facilities evenly distributed and equal forces are applied to the object. When attaching the cutting apparatus 20 to different size objects, the wrapping member 46 will extend from different points of the arcuate engagement surface 48. The arcuate feature of the engagement surface accommodates the different sized objects and facilitates evenly distributed and equal forces are applied to the object.

The saddle 28 includes a plurality of pads or saddle plates 50 adapted to engage an outer surface of the object and assist with coupling the cutting apparatus 20 to the object. The saddle plates 50 include engagement surfaces angled relative to each other and having a surface treatment that results in relatively high friction between the saddle plates 50 and the outer surface of the object. In some examples, the engagement surfaces may include projections or teeth.

The frame height adjustment mechanism 40 includes a shaft 52 and a feed handle 54 configured to rotate the shaft 52. The shaft 52 is coupled to and supported by the saddle 28 at its lower end and the top guide plate 30 at its upper end such that the shaft 52 can rotate relative to the saddle 28 and top guide plate 30 about a longitudinal central axis of the shaft 52, but is prohibited from moving vertically or axially along the central axis. The shaft 52 has external threads defined in an exterior thereof. The handle 54 is fixedly coupled to a top end of the shaft 52 and is manipulatable by an operator to rotate the shaft 52 in two directions.

The frame assembly 24 includes a frame base plate assembly 56, a wire tensioning assembly 58 mounted on the frame base plate assembly 56 and vertically movable relative to the frame base plate assembly 56, a right arm assembly 60 pivotally mounted on the wire tensioning assembly 58, a left arm assembly 62 pivotally mounted on the frame base plate assembly 56, a cover 64 hingedly mounted on the frame base plate assembly 56, and the cutting member 26. The wire tensioning assembly 58 is adjustable to adjust a quantity of tension applied to the cutting member 26 and may be adjusted to allow removal and replacement of the cutting member 26.

As shown in FIGS. 10-13, the frame base plate assembly 56 includes a frame base plate 66 having a front surface 66a, a rear surface 66b, a top surface 66c, a bottom surface 66d and right and left side surfaces 66e, 66f, a drive wheel 68 rotatably mounted on the front surface 66a thereof, and a drive mechanism 70 mounted on the rear surface 66b thereof and attached to the drive wheel 68 to operate the drive wheel 68.

The frame base plate 66 has trunnions 72, 73, 74, 76 and a frame block 78 extending outwardly from the rear surface 66b thereof. Each trunnion 72, 73, 74, 76 has a passageway provided from between a top surface and a bottom surface thereon, and a bushing is mounted in each passageway. A drive shaft of the drive mechanism 70 extends through an aperture provided through the frame base plate 66. The drive wheel 68 is proximate to the front surface 66a of the frame base plate 66 and is coupled to the drive mechanism 70 on the rear surface 66b of the frame base plate 66 via the drive shaft. Trunnions 74, 76 are provided on one of side of the drive mechanism 70 and are vertically aligned with each other. Trunnions 72, 73 are provided on the other side of the drive mechanism 70, are vertically aligned with each other, trunnion 72 is horizontally aligned with trunnion 74, and trunnion 73 is horizontally aligned with trunnion 76. The frame block 78 has a threaded passageway 80 therethrough which extends from an upper surface of the frame block 78 to a lower surface of the frame block 78. The frame base plate 66 further has a left arm retaining block 82 and an arm mounting pin 84 extending outwardly from the front surface 66a. The left arm retaining block 82 is proximate to the bottom surface 66d and proximate to the corner between the bottom surface 66d and the left side surface 66f. The left arm retaining block 82 has first and second spaced apart notches 86a, 86b provided in a lower surface thereof.

In the illustrated example, the drive mechanism 70 is a hydraulic drive system. Alternatively, the drive mechanism 70 may be a motor, a pneumatic drive mechanism, an electric drive mechanism, etc.

As shown in FIGS. 14-19, the wire tensioning assembly 58 includes a wire tensioning base plate 88 having a front surface 88a and a rear surface 88b, a right arm adjustment mechanism 90 mounted on the front surface 88a thereof, a tension indicator mechanism 92 mounted on the rear surface 88b thereof, and a wire tensioning height adjustment mechanism 94 mounted on the rear surface 88b thereof. The wire tensioning height adjustment mechanism 94 works in conjunction with a wheel slide block 132 extending from the frame base plate 66.

The wheel slide block 132 has a passageway therethrough which extends from an upper surface of the wheel slide block 132 to a lower surface of the wheel slide block 132 in which bushings 134 are seated.

A trunnion 96 extends outwardly from the rear surface 88b of the wire tensioning base plate 88. The trunnion 96 has a passageway 98 extending between a top surface and a bottom surface thereof, and a bushing is mounted therein. A bore 100 extends downwardly from the top surface of the trunnion 96 and is spaced from the passageway 98, and a threaded feed nut is mounted therein.

The wire tensioning height adjustment mechanism 94 includes a threaded rod 102 having a knob 104 at an upper end of the rod. A lower end of the rod 102 is threadedly engaged with the feed nut in the bore 100. The rod 102 is rotatable relative to the trunnion 96, and the trunnion 96, and thus the wire tensioning base plate 88 translates along the rod 102 upon rotation of the rod 102.

The right arm adjustment mechanism 90 includes a housing 105 having a piston 106 extending outwardly therefrom and a spring 108 within the housing 105 to bias the piston 106. The piston 106 includes a shaft 110 having an enlarged piston head 112 at an end thereof. A notch 114a is provided in a lower surface of the housing 105 proximate to the end of the housing 105 from which the piston 106 extends. A notch 114b is provided in a lower surface of the piston head 112.

The tension indicator mechanism 92 includes a housing 116 which extends outwardly from the rear surface 88b of the wire tensioning base plate 88 at a position spaced below the trunnion 96, a passageway 118 through the housing 116 which extends from a front side 116a of the housing 116 to a rear side 116b thereof, a movable indicator arm 120 positioned within the passageway 118 and pivotally connected to the housing 116 by an arm mounting pin 122, and a rod 124 pivotally attached to the indicator arm 120 by an arm mounting pin 126. In an embodiment, the indicator arm 120 is L-shaped. The rod 124 is fixedly attached to an upper end of the piston head 112 and extends through an elongated horizontal slot 128 through the wire tensioning base plate 88. The housing 116 has indicia 130 thereon which correspond to a "SET" position, a "CUT 1" position and a "CUT 2" position. An end 120a of the movable indicator arm 120 is visible from above the housing 116 so that an operator can see when the end 120a aligns with one of the "SET" position, the "CUT 1" position and the "CUT 2" position. When the piston 106 is moved horizontally as discussed herein, movement of the piston head 112 causes the rod 124 to translate along the slot 128, which in turn causes the indicator arm 120 to pivot within the passageway 118 of the housing 116. Depending upon where the piston head 112 is, the end 120a of the movable indicator arm 120 will align with one of the one of the "SET" position, the "CUT 1" position and the "CUT 2" position for reasons described herein.

Figure 22:
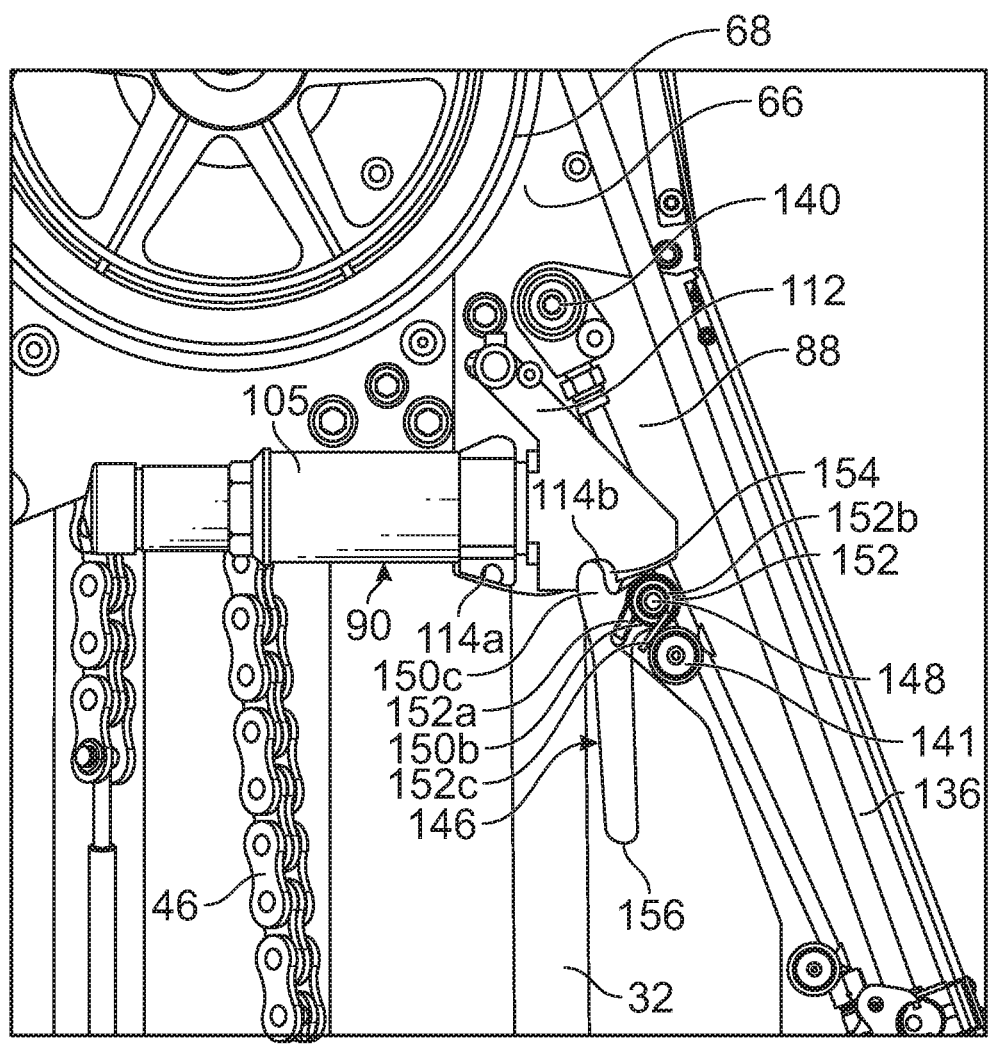
FIG. 22 is a partial front elevation view of the cutting apparatus, with the arm plate of the right arm assembly removed and the cover removed.

As shown in FIGS. 20-22, the right arm assembly 60 includes a rear plate 136 and a front plate 138 in a parallel arrangement. A plurality of spacers 141 are disposed between the parallel plates 136, 138 to separate the rear plate 136 from the front plate 138 by a predetermined distance. An inner side opening is provided between the plates 136, 138 on an inner side thereof; a bottom opening is provided between the plates 136, 138 on a bottom side thereof; and an outer side opening is provided between the plates 136, 138 on an outer side thereof, and a top opening is provided between the plates 136, 138 on a top side thereof. An arm mounting pin 140 extends outwardly from the front surface 88a of the wire tensioning base plate 88 and extends through the plates 136, 138 proximate to the top ends thereof to attach the right arm assembly 60 to the frame base plate 66 of the wire tensioning assembly 58 vertically upwardly of the piston head 112. An arm wheel 142 is rotationally mounted between the plates 136, 138 proximate to the bottom ends thereof by an axle 144 mounted between the plates 136, 138. The arm mounting pin 140 may be integrally formed with the wire tensioning base plate 88 such that a one-piece member is provided.

A spring-biased latch 146 is pivotally attached to the plates 136, 138 by an arm mounting pin 148 extending between the plates 136, 138. The spring-biased latch 146 includes a latch arm 150 and a spring 152. The latch arm 150 has an elongated handle section 150a, a pivot mount section 150b extending outwardly from the handle section 150a proximate to an upper end thereof, and a finger section 150c which protrudes upwardly from the upper end of the handle section 150a. The finger section 150c has a curved end surface 154. The spring 152 has a first end section 152a which is engaged with the pivot mount section 150b, a coiled section 152b extending from the first end section 152a which is wrapped around the pin 148, and a second end section 152c extending from the coiled section 152b and which is engaged with one of the spacers 141. The spring 152 normally biases the latch arm 150 into a first position such that a lower end 156 of the handle section 150a of the latch arm 150 is pivoted away from the plates 136, 138.

The finger section 150c can seat within the notch 114a provided in the piston housing 105 or can seat within the notch 114b provided in the piston head 112. When the finger section 150c is seated within the notch 114a provided in the piston housing 105, the right arm assembly 60 is in the storage position. When the finger section 150c is seated within the notch 114b provided in the piston head 112, the right arm assembly 60 is in the operating position. The notches 114a, 114b are slightly larger than the finger section 150c such that the finger section 150c can be released from the notches 114a, 114b when an operator pivots the latch arm 150 around its arm mounting pin 148. When the latch arm 150 is engaged with the notch 114b in the piston head 112 in the operating position and the piston 106 is moved as described herein, the notch 114b is sized to allow the finger section 150c to pivot within the notch 114b, but to maintain engagement of the finger section 150c and the piston head 112.

Figure 24:
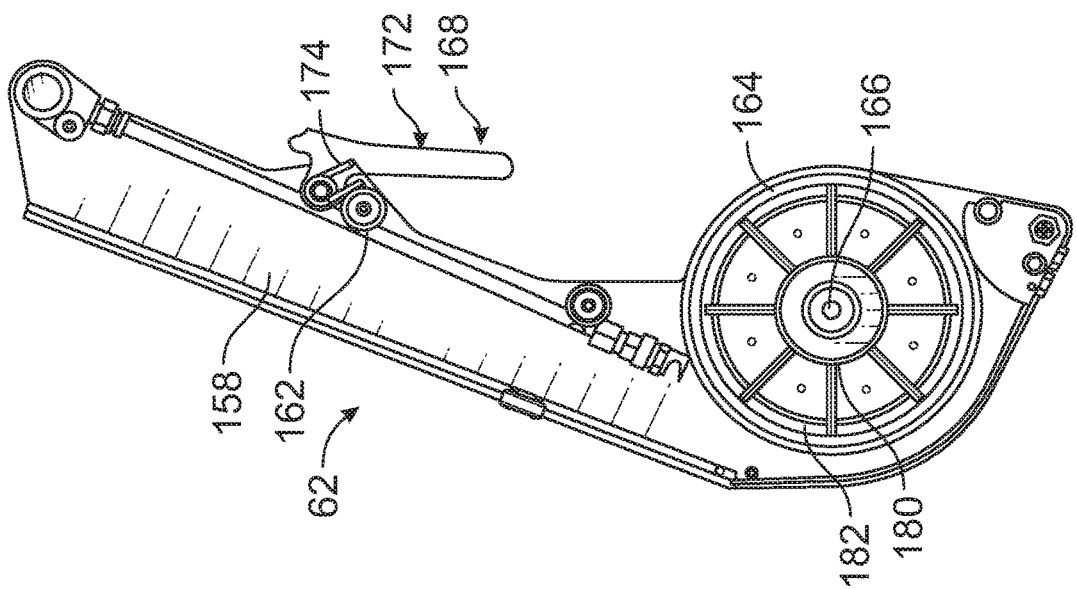
FIG. 24 is a front elevation view of the left arm assembly with an arm plate removed.
Figure 23:
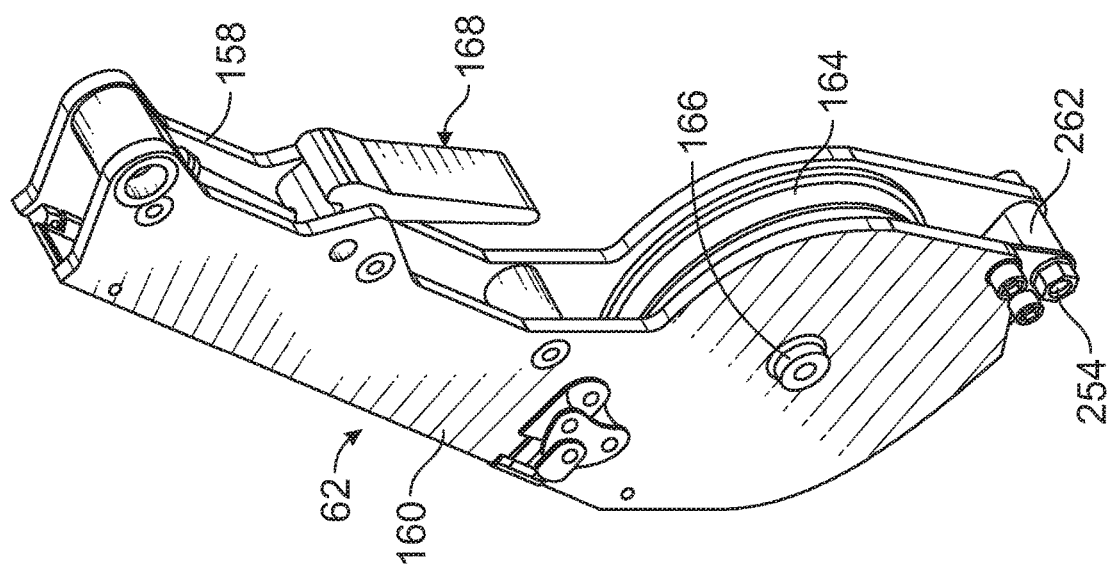
FIG. 23 is a top, front perspective view of a left arm assembly of the cutting apparatus.
Figure 25:
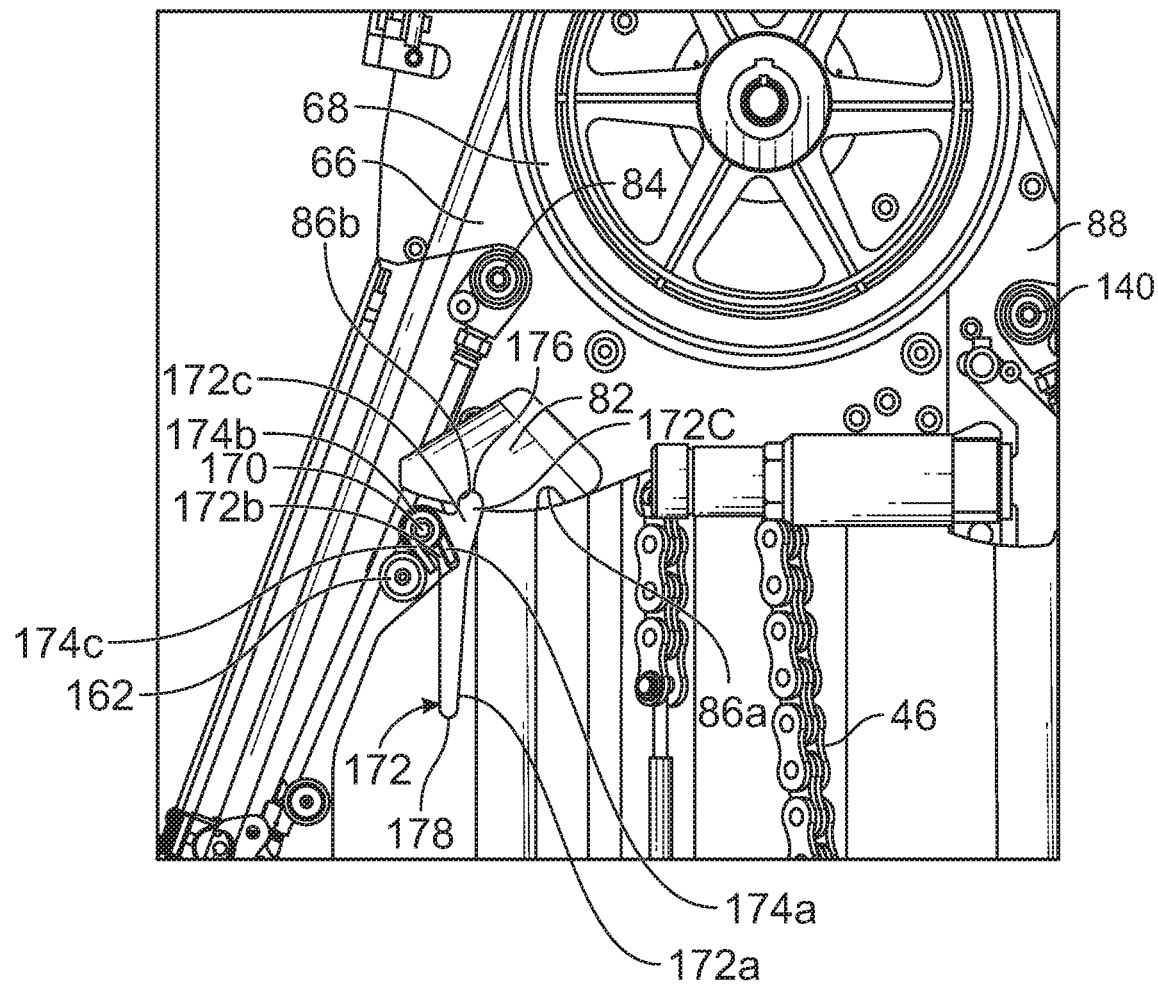
FIG. 25 is a partial front elevation view of the cutting apparatus, with the arm plate of the left arm assembly removed and the cover removed.

As shown in FIGS. 23-25, the left arm assembly 62 includes a rear plate 158 and a front plate 160 in a parallel arrangement. A plurality of spacers 162 are disposed between the parallel plates 158, 160 to separate the rear plate 158 from the front plate 160 by a predetermined distance. An inner side opening is provided between the plates 158, 160 on an inner side thereof; a bottom opening is provided between the plates 158, 160 on a bottom side thereof; and an outer side opening is provided between the plates 158, 160 on an outer side thereof, and a top opening is provided between the plates 158, 160 on a top side thereof. The arm mounting pin 84 extends outwardly from the frame base plate 66 and extends through the plates 158, 160 proximate to the top ends thereof to attach the left arm assembly 62 to the frame base plate 66 of the frame base plate assembly 56 vertically upwardly of the left arm retaining block 82. An arm wheel 164 is rotationally mounted between the plates 158, 160 proximate to the bottom ends thereof by an axle 166 mounted between the plates 158, 160. The arm mounting pin 84 may be integrally formed with the frame base plate 66 such that a one-piece member is provided.

A spring-biased latch 168 is pivotally attached to the plates 158, 160 by an arm mounting pin 170 extending between the plates 158, 160. The spring-biased latch 168 includes a latch arm 172 and a spring 174. The latch arm 172 has an elongated handle section 172a, a pivot mount section 172b extending outwardly from the handle section 172a proximate to an upper end thereof, and a finger section 172c which protrudes upwardly from the upper end of the handle section 172a. The finger section 172c has a curved end surface 176. The spring 174 has a first end section 174a which is engaged with the pivot mount section 172b, a coiled section 174b extending from the first end section 174a which is wrapped around the pin 170, and a second end section 174c extending from the coiled section 174b and which is engaged with one of the spacers 162. The spring 174 normally biases the latch arm 172 into a first position such that a lower end 178 of the handle section 172a of the latch arm 172 is pivoted away from the plates 158, 160.

The finger section 172c can seat within the notch 86a or in the notch 86b provided in the left arm retaining block 82. When the finger section 172c is seated within the notch 86a, the left arm assembly 62 is in the storage position. When the finger section 172c is seated within the notch 86b, the left arm assembly 62 is in the operating position. The notches 86a, 86b are slightly larger than the finger section 172c such that the finger section 172c can be released from the notches 86a, 86b when an operator pivots the latch arm 172 around its arm mounting pin 170.

In the illustrated example, each arm wheel 142, 164 includes a central hub 180 and an outer body member 182. Each arm wheel 142, 164 defines a pair of spaced-apart flanges and a recess between the flanges for receiving the cutting member 26 therein. In one example, the arm wheel 142, 164 are formed of plastic with a cast urethane wear surface to provide the arm wheel 142, 164 with sufficient strength and durability to withstand the stresses realized during operation of the cutting apparatus 20.

The cutting member 26 forms a loop around the drive wheel 68 and the arm wheels 142, 164. The cutting member 26 is attached to the drive wheel 68 and partially encircles the drive wheel 68, is attached to the arm wheel 142 of the right arm assembly 60 and partially encircles the arm wheel 142, and is attached to the arm wheel 164 of the left arm assembly 62 and partially encircles the arm wheel 164.

The guide shaft 34 of the feed tower assembly 22 extends through the trunnions 74, 76 extending from the frame base plate 66 of the frame base plate assembly 56. The guide shaft 32 of the feed tower assembly 22 extends through the trunnions 72, 73 on the frame base plate 66 of the frame base plate assembly 56 and through the passageway 98 of the trunnion 96 extending from the wire tensioning base plate 88 of the wire tensioning assembly 58. The shaft 52 of the feed tower assembly 22 extends through and is threadedly engaged with the passageway 80 of the frame block 78 extending from the frame base plate 66 of the frame base plate assembly 56. The rod 102 of the wire tensioning height adjustment mechanism 94 of the wire tensioning assembly 58 extends through the top guide plate 30 of the feed tower assembly 22 and the knob 104 is above the top guide plate 30. The rod 102 of the wire tensioning assembly 58 further extends through the bushings 134 in the passageway of the wheel slide block 132 of the base frame assembly 24 and is captively engaged with the bushings 134. This couples the feed tower assembly 22, the frame base plate assembly 56 and the wire tensioning assembly 58 together.

To initially adjust the tension on the cutting member 26, the arm assemblies 60, 62 are moved to the operating position by pivoting the latch arms 150, 172 to engage the finger sections 150c, 172c into the notches 114b, 86b, and the feed tower assembly 22 is mounted to the object using the coupling assembly 38. The wrapping member 46 is uncoupled from the connector 44, the cutting apparatus 20 is positioned on top of the object such that the saddle plates 50 engage the object, the wrapping member 46 is wrapped around the object, the wrapping member 46 is coupled again to the connector 44, and the handle 42 is rotated in a direction that causes the connector 44 to translate toward the handle 42, thereby tightening the wrapping member 46 around the object. The handle 42 is rotated until a desired amount of tension and forces are applied to the object to ensure a secure coupling of the cutting apparatus 20 to the pipe. The wrapping member 46 will engage and extend from the arcuate engagement surface 48 at a location dependent upon the size or diameter of the pipe.

The cutting member 26 will be in engagement with an upper surface of the object to be cut. Thereafter, the knob 104 is rotated to rotate the rod 102 of the wire tensioning height adjustment mechanism 94 relative to the top guide plate 30 of the feed tower assembly 22 and relative to the wheel slide block 132. This causes the wire tensioning base plate 88 to move relative to the frame base plate 66, thereby causing the right arm assembly 60 to move upwardly or downwardly depending upon which direction the knob 104 is rotated. As a result, the right arm assembly 60 moves relative to the drive wheel 68, relative to the left arm assembly 62, and relative to the object. The trunnion 96 slides along the guide shaft 32 during this movement. When the right arm assembly 60 is moved downwardly, the cutting member 26 presses against the object. As this motion occurs, the right arm assembly 60 pivots around its arm mounting pin 140 and rotates inwardly against the action of the spring-biased piston 106 (to the extent that the spring force of the spring-biased piston 106 allows for such movement). As the piston head 112 is moved toward the left arm assembly 62, the spring 108 within the piston housing 105 compresses, and the rod 124 translates along the slot 128, which in turn causes the indicator arm 120 to pivot within the passageway 118 of the housing 116. Rotation of the knob 104 and rod 102 is continued until the indicator arm 120 aligns with the "SET" position. Movement of the right arm assembly 60 upwardly decreases the tension on the cutting member 26. Movement of the right arm assembly 60 downwardly increases the tension on the cutting member 26. When in the "SET" position, the cutting member 26 "bends" around the object. By having the bend in the cutting member 26, more surface area of the cutting member 26 is engaging the object rather than just a small surface area if the cutting member 26 is too taut and extends straight or substantially straight across between the arm wheels 142, 164. Greater surface area engagement between the cutting member 26 and the object facilitates more effective cutting of the object.

Once the cutting assembly 20 is in the "SET" position mounted to the object, the object is ready to be cut. To form the cut, the operator turns the feed handle 54 of the frame height adjustment mechanism 40 to move the frame base plate assembly 56, the wire tensioning assembly 58, both arm assemblies 60, 62 and the cutting member 26 downwardly toward the object and relative to the feed tower assembly 22. As the frame base plate assembly 56, the wire tensioning assembly 58, both arm assemblies 60, 62 and the cutting member 26 are moved downwardly, the cutting member 26 presses against the object. As this motion occurs, the right arm assembly 60 pivots around its arm mounting pin 140 and rotates inwardly. The piston head 112 moves inwardly from the piston housing 105 under the force from the spring 108. As the piston head 112 moves inwardly, the rod 124 translates along the slot 128, which in turn causes the indicator arm 120 to pivot within the passageway 118 of the housing 116 to the desired "CUT 1" position or "CUT 2" position. The operator maintains a rotation rate on the feed handle 54 which keeps the indicator arm 120 at the desired "CUT 1" position or "CUT 2" position. The cutting member 26 will then cut through the object. This represents the balance and dynamic tension between the "payout" or slack in the cutting member 26 and the pressure exerted on the cutting member 26 during cutting. Dynamic movement adjusts the tension in the cutting member 26 during operation. For a given amount of slack, a certain wire pressure is operator-maintained for optimal cutting.

When the cutting apparatus 20 is not engaged with the object, the cutting member 26 can be released from the drive wheel 68 and the arm wheels 142, 164 for replacement. It may be desirable to remove and replace a cutting member 26 for example, if the cutting member 26 is worn out, damaged, or a different type of cutting member 26 is desired based on the type of object to be cut. The cutting member 26 may be removed from the cutting apparatus 20 when the cutting apparatus 20 is in either the storage position or the operating position (i.e., with the two arm assemblies 60, 62 inward or outward). To replace the cutting member 26, the wire tensioning assembly 58 is used to raise the right arm wheel 142 upwardly toward the drive wheel 68. This reduces or releases the tension applied to the cutting member 26 and the cutting member 26 may be removed from all the wheels 68, 142, 164. Another cutting member 26 may replace the previous cutting member 26. The new cutting member 26 is wrapped around the drive wheel 68 and the arm wheels 142, 164. The wire tensioning assembly 58 is used to lower the arm wheel 142 away from the drive wheel 68 in a second direction opposite the first direction, thereby increasing or applying tension to the cutting member 26.

A guard 186 may extend outwardly from the front surface 88a of the wire tensioning base plate 88 proximate to the upper end of the right arm assembly 60.

The cover 64 can be selectively opened to provide access to the drive wheel 68, and can be closed to prevent access to and to protect the drive wheel 68. The cover 64 is coupled to the frame base plate 66 by a plurality of pins 188, a hinge 190 and a latch 192.

The cover 64 has a front wall 194a having front and rear surfaces, a top wall 194b depending from a top end of the front wall 194, and side walls 194c, 194c depending from the opposite sides of the front wall 194a. A plurality of openings 196 are provided through the cover 64.

Figure 26:
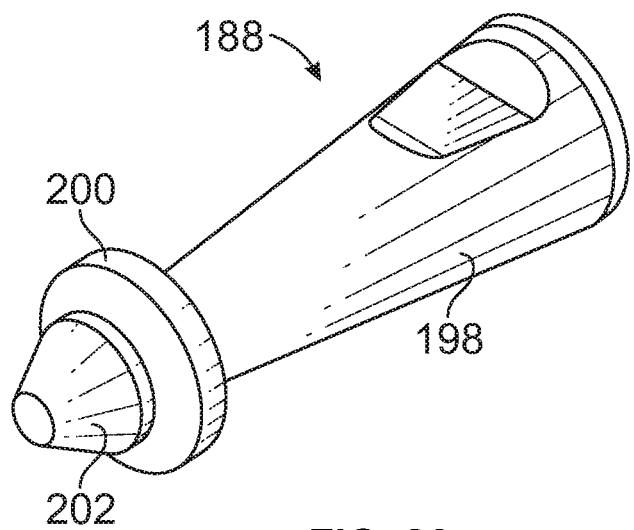
FIG. 26 is a perspective view of a pin used to retain the cover in a closed position.
Figure 27:
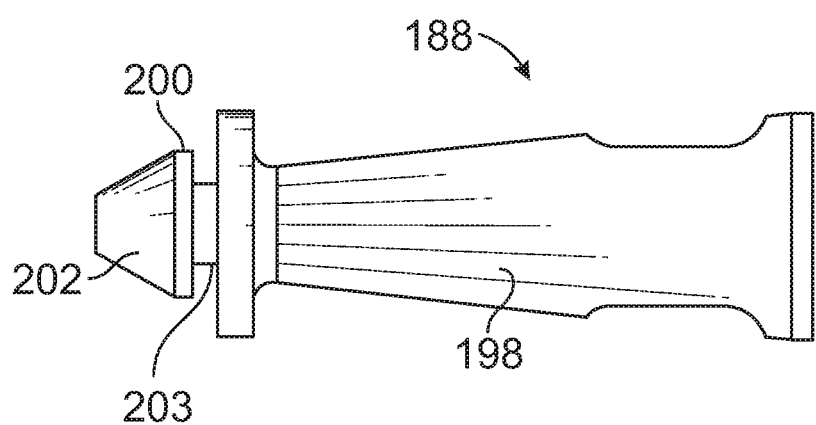
FIG. 27 is a side elevation view of the pin.

As shown in FIGS. 26 and 27, each pin 188 has an elongated shaft 198 which extends outwardly from the front surface 66a of the frame base plate 66, a flange 200 extending radially outwardly from the shaft 198, and an enlarged head 202 at the end of the shaft 198 and which is spaced from the flange 200. A recess 203 is provided between the head 202 and the flange 200. Each opening 196 is larger than the head 202 of the respective pin 188, but smaller than the flange 200.

Figure 28:
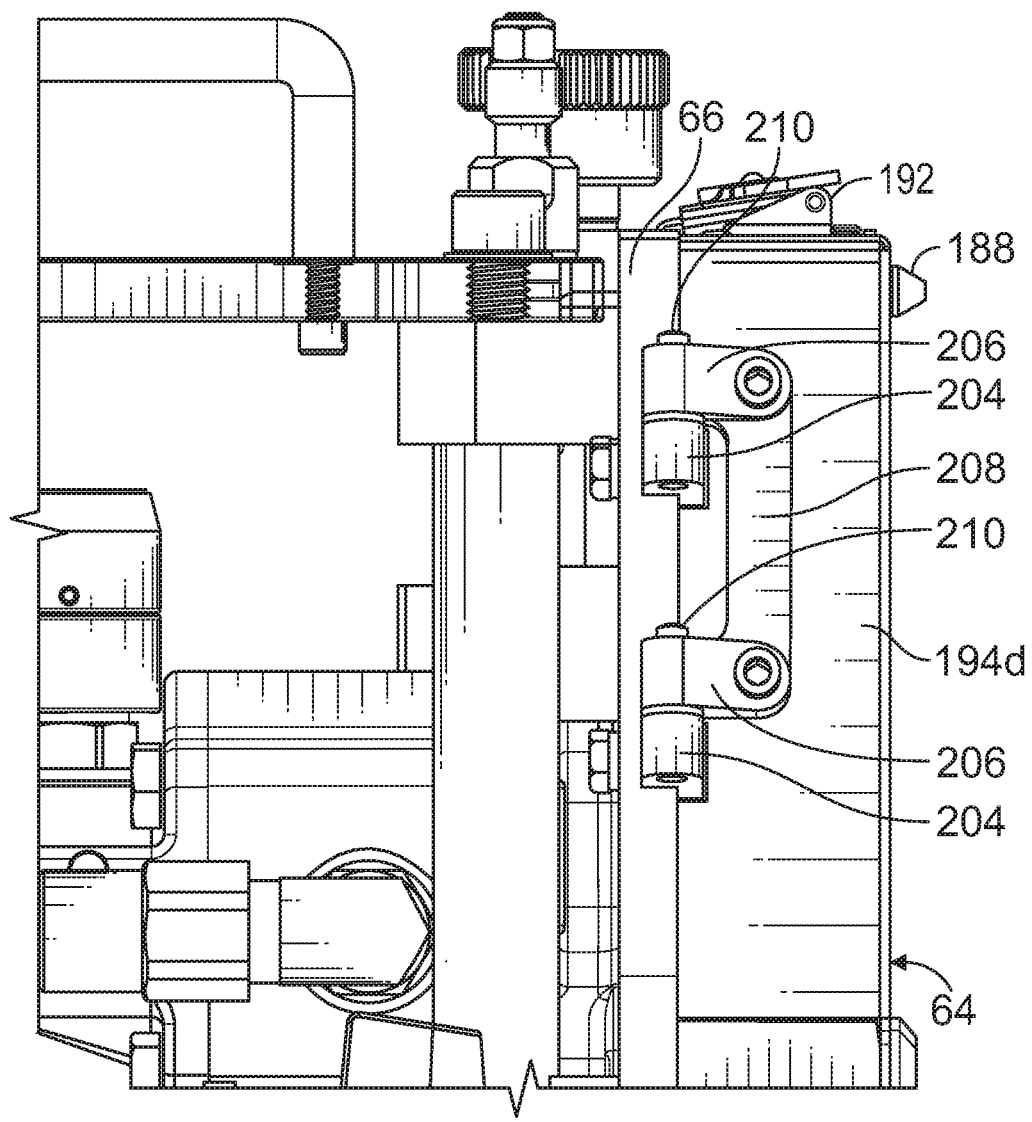
FIG. 28 is a partial side elevation view of the cutting apparatus.
Figure 29:
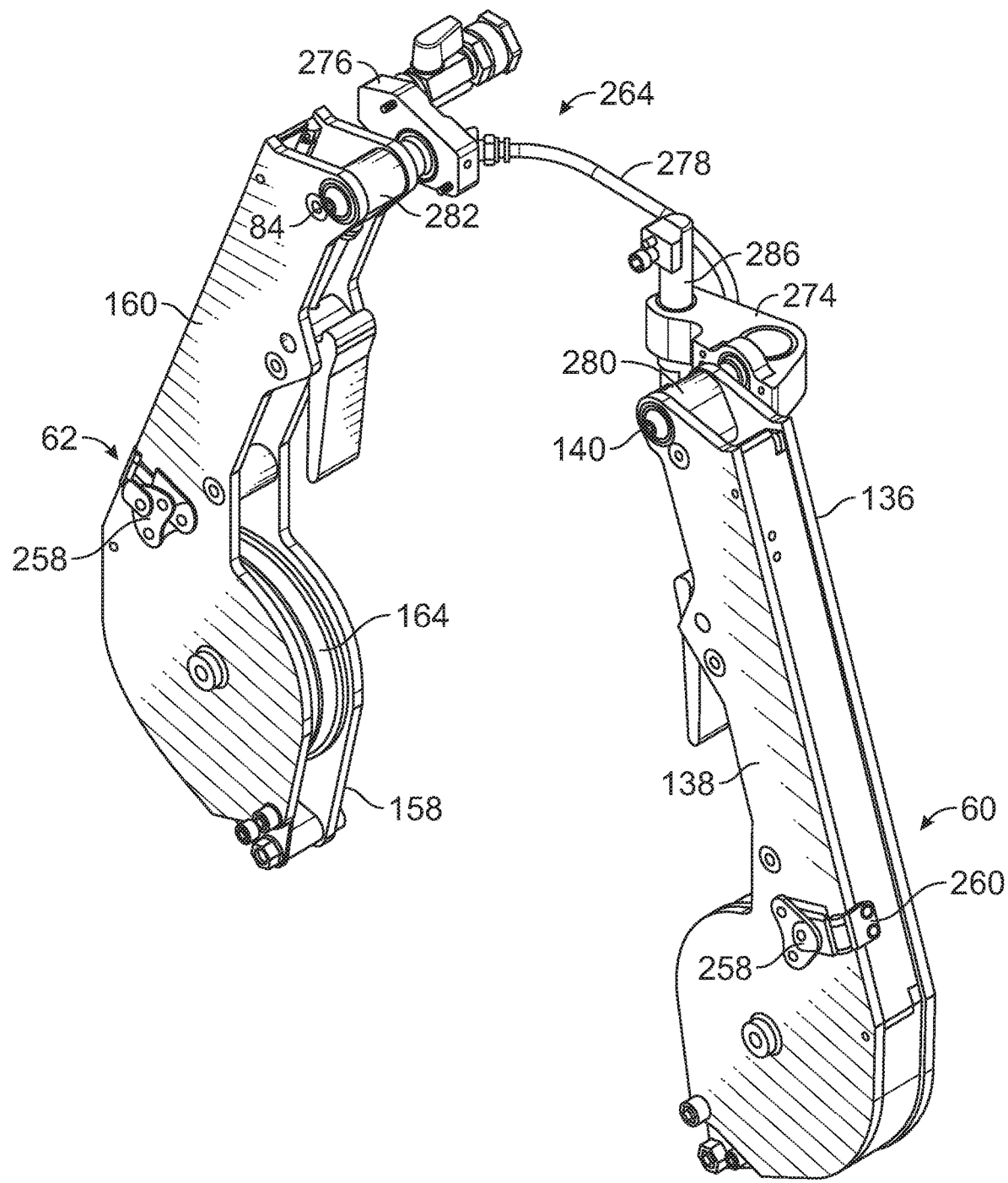
FIG. 29 is a perspective view of some of the components of the cutting apparatus, showing the arm assemblies and a liquid dispensing system.

As shown in FIG. 28, the hinge 190 has cylindrical knuckles 204 coupled to the frame base plate 66, and cylindrical leaves 206 coupled to the side wall 194d of the cover 64. The leaves 206 are connected together by a bar 208. Pins 210 extend through the respective knuckles/leaves 204/206.

The latch 192 has a first part on the top wall 192b of the cover 64 and a second mating part on the top surface of the frame base plate 66. When the parts of the latch 192 are engaged with each other, the cover 64 cannot be opened.

When the cover 64 is in a closed position, the top wall 194b of the cover 64 overlaps the top surface of the frame base plate 66, the side walls 194c, 194d of the cover 64 overlap the sides of the frame base plate 66, and the bottom edge of the front wall 192a aligns with, or is below, the bottom edge of the frame base plate 66. The pins 188 are positioned at the top of the openings 196, with the heads 202 of the pins 188 extending through respective openings 196 and the front wall 196a seats within the recess 203 of each pin 188. Each leaf 206 is proximate to the respective knuckle 204. The front wall 194a of the cover 64 covers the drive wheel 68, the frame base plate assembly 56, the wire tensioning assembly 58, and an upper portion of each arm assembly 60, 62. The side walls 194c, 194d cover the sides of the drive wheel 68.

To open the cover 64, the parts of the latch 192 are disengaged. Thereafter, the operator lifts the cover 64 upwardly. The leaves 206 travel upwardly along the pins 210. Once the front wall 194a of the cover 64 is no longer seated within the recesses 203, the cover 64 is rotated around the pins 210 to move the cover 64 to the open position.

To again close the cover 64, the cover 64 is rotated around the pins 210 until the rear surface of the front wall 194a of the cover 64 engages with the heads 202 of the pins 188. The heads 202 of the pins 188 are conical, so the cover 64 will slide along the heads 202 to move upwardly relative to the pins 188 and the frame base plate 66. Once the cover 64 is moved past the heads 202, the cover 64 will drop into the recesses 203. Thereafter, the latch 192 is reengaged.

As will be prevalent after reviewing the present disclosure in its entirety, the cutting apparatus 20 may be set-up, operated, and configured into its storage position all without the use of tools, which eliminates the need to carry or keep track of tools.

The orientation and configuration of all of the wheels 68, 142, 164 of the cutting apparatus 20 enable the cutting apparatus 20 to include a cutting member 26 of a relatively long length. In one example, the cutting member 26 can have a length of about 105 inches. In one example, the cutting member 26 can have a length between about 95 inches and about 120 inches. In one example, the quantity that the cutting member 26 wraps around each of the wheels 68, 142, 164 may be specifically designed to inhibit slippage between the cutting member 26 and the wheels 68, 142, 164 during operation and provide sufficient support to the cutting member 26. Additionally, in the illustrated example, all of the wheels 68, 142, 164 are aligned and centered in a common plane, which inhibits drifting and pitching of the wheels 68, 142, 164 during operation of the cutting apparatus 20.

With the cutting apparatus 20 in its storage position, the cutting apparatus 20 is compact and can be transported, such as by carrying, to a variety of environments that conventional cutting apparatuses could not previously be transported to. For example, the cutting apparatus 20 may easily pass through a manhole opening in the ground to perform work on subterranean pipes. Conventional cutting apparatuses may be too large to pass through a manhole. Once the cutting apparatus 20 is at or near a desired cutting location, the cutting apparatus 20 may either be initially coupled to an object or initially moved from its storage position to its operating position. For purposes of this exemplary operational description, the object has been described as a pipe. However, the cutting apparatus 20 is adapted to cut a wide variety of objects and the description herein pertaining to a pipe is not intended to be limiting to the present disclosure.

The operational examples of the cutting apparatus 20 described herein are only some of the many different ways of operating the cutting apparatus 20 and are not intended to be limiting upon the present disclosure.

The engagement of the latch arms 150, 172 with the piston head 112 and the left arm retaining block 82 when in the operating position provide structural support for the arm assemblies 60, 62 when under load, and also provides structural rigidity for the arm assemblies 60, 62 when under load. When the cutting member 26 is tightened and under load, the arm assemblies 60, 62 are loaded between the upper arm mounting pins 140, 84 and the arm wheels 142, 164. The entire load is supported by the arm assemblies 60, 62. To increase rigidity and structural integrity and to prevent flexing of the arm assemblies 60, 62 when under load, the latch arms 150, 172 are engaged with the piston head 112 and the left arm retaining block 82 at about the mid-point of each arm assembly 60, 62, and preferably may be positioned slightly toward the upper arm mounting pins 140, 84. This stabilizes the arm wheels 142, 164. Because the arm assemblies 60, 62 are not supported in a cantilevered manner, all forces acting due to tension in the cutting member 26 act in single plane, that is, in the plane of the cutting member 26, the drive wheel 68 and the arm wheels 142, 164. Lateral deflection of the arm assemblies 60, 62 is prevented due to relatively tight frictional fit between the latch arms 150, 172 and the piston head 112 and the left arm retaining block 82.

The number of components disposed on the front surface 66a of the frame base plate 66 and the front surface 88a of the wire tensioning base plate 88 are minimized because it is this area that may be subject to the accumulation of debris during the cutting operation. No sensors, springs, or sensitive components are located in this area specifically to isolate such components from any such debris. The cover 64 and the frame base plate 66 essentially isolates the sensitive components disposed on the rear surface 66b of frame base plate 66 from the debris area associated with the front surface 66a of the frame base plate 66, because minimal pathways are provided therebetween. Because the arm wheels 142, 164 create a fan-like action when rotating to sweep debris away from the wheel center. Thus, the components on the rear surface 66b of the frame base plate 66 remain isolated and protected from debris.

In an embodiment, each arm assembly 60, 62 includes a lower latchable door 250 which closes the bottom opening between the plates 136, 138, 158, 160, and an upper latchable door 252 which closes the outer side opening between the plates 136, 138, 158, 160. The doors 250 are shaped to conform to the shape of the bottom opening between the plates 136, 138, 158, 160 and are pivotally attached to the plates 136, 138, 158, 160 by arm mounting pin 254. The doors 252 are shaped to conform to the outer side opening between the plates 136, 138, 158, 160 and are hingedly attached to the plate 136, 158 by a hinge 256. A latch part 258 is attached to the other plate 138, 160 and mates with a latch part 260 on the upper door 252.

In a closed position, an upper end of the lower door 250 engages with the lower end of the upper door 252 such that the upper end of the lower door 250 is inwardly of the lower end of the upper door 252. The latch parts 258, 260 are engaged to maintain both doors 250, 252 in a closed position.

To open the doors, the latch parts 258, 260 are disengaged and the upper door 252 rotates around its hinge 256, thereby exposing the outer opening. Once the upper door 252 is opened, the lower door 250 is free to rotate around its arm mounting pin 254 by gravity, thereby exposing the bottom opening. When the doors 250, 252 are in the open position, the interior portion of the arm assemblies 60, 62, including the arm wheels 142, 164, may be easily cleaned so as to remove debris that may accumulate during the cutting process.

A housing 262 around the arm mounting pin 254 of the lower door 250 may be hardened such that if the cutting member 26 is severed, the arm mounting pin 254 will be resistant to damage.

Further, with the latchable doors 250, 252 in the open position, changing the cutting member 26 is fast and easy, and no tools are required. Note that the latching doors 250, 252 merely provide access to the internal partially enclosed space between the plates 136, 138, 158, 160 and are not needed to provide structural support or integrity for the arm assemblies 60, 62.

While two latchable doors 250, 252 are provided, it is to be understood that a single door could be provided, or more than two doors could be provided.

Referring now to FIGS. 29-42, the cutting apparatus 20 includes a liquid dispensing assembly 264 adapted to dispense pressurized liquid to assist with cooling portions of the cutting apparatus 20 during operation. A large quantity of heat can be realized when using the cutting apparatus 20 to cut an object. Excessive quantities of heat can undesirably damage the cutting member 26 and/or components of the cutting apparatus 20. Thus, the liquid dispensing assembly 264 assists with inhibiting excessive heat during operation. The liquid dispensing assembly 264 also decreases the amount of debris that moves upward into the cutting apparatus 20 during operation of the cutting apparatus 20. The liquid dispensed from the liquid dispensing assembly 264 engages debris, captures the debris and falls or runs downward, thereby bringing the debris with it as it falls. Excessive debris buildup in the cutting apparatus 20 may negatively affect operation of the cutting device and/or damage the cutting apparatus 20. In one example, the liquid is water.

Figure 30:
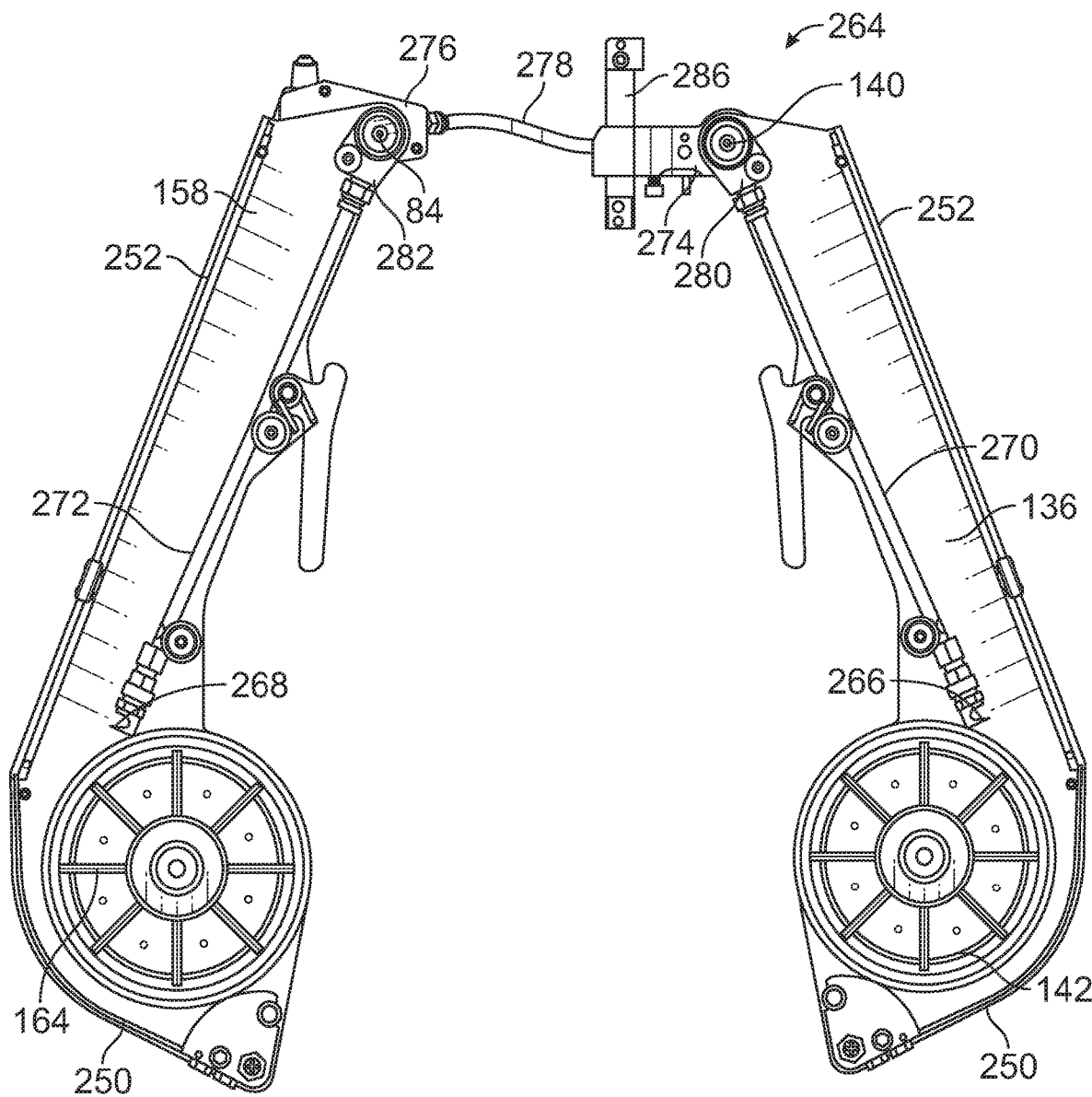
FIG. 30 is a front elevation view of some of the components of the cutting apparatus, showing the arm assemblies having a front plate removed, and the liquid dispensing system.
Figure 31:
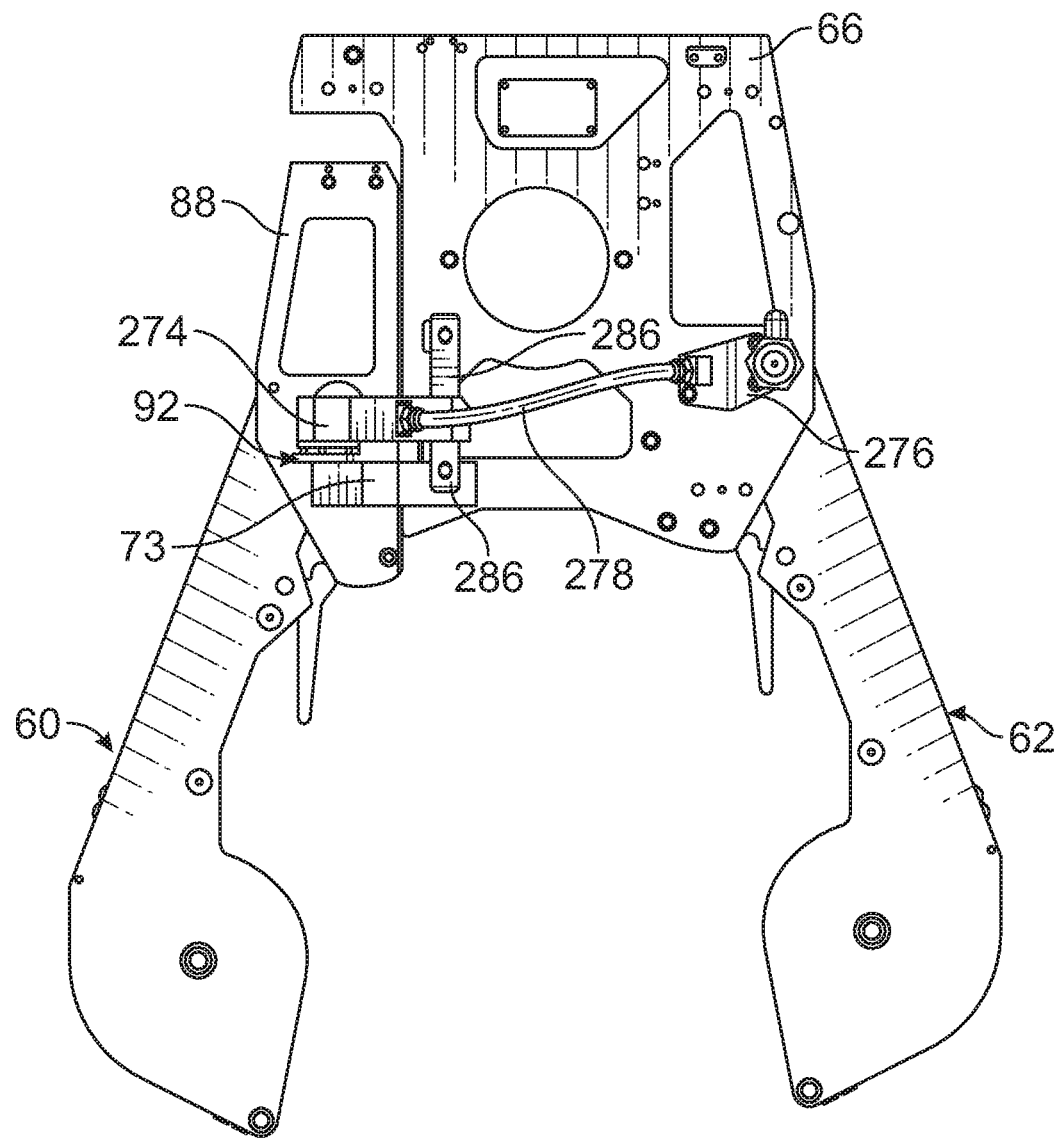
FIG. 31 is a rear elevation view of some of the components of the cutting apparatus, showing the arm assemblies, and the liquid dispensing system.

The liquid dispensing assembly 264 includes right and left dispensers or sprayers 266, 268 and right and left conduits 270, 272 for communicating pressurized liquid to the dispensers 266, 268, see FIG. 30. Dispenser 266 is coupled to an interior surface of the plate 136 of the right arm assembly 60 and conduit 270 is connected to the dispenser 266; dispenser 268 is coupled to an interior surface of the plate 158 of the left arm assembly 62 and conduit 272 is connected to the dispenser 268. The conduits 270, 272 communicate liquid to the respective dispenser 266, 268. Each conduit 270, 272 may be rigid.

The liquid dispensing assembly 264 further includes a right liquid passageway block 274, a left liquid passageway block 276, a flexible conduit 278 extending between the right and left liquid passageway blocks 274, 276, a right mounting pin housing 280, and a left mounting pin housing 282.

Figure 32:
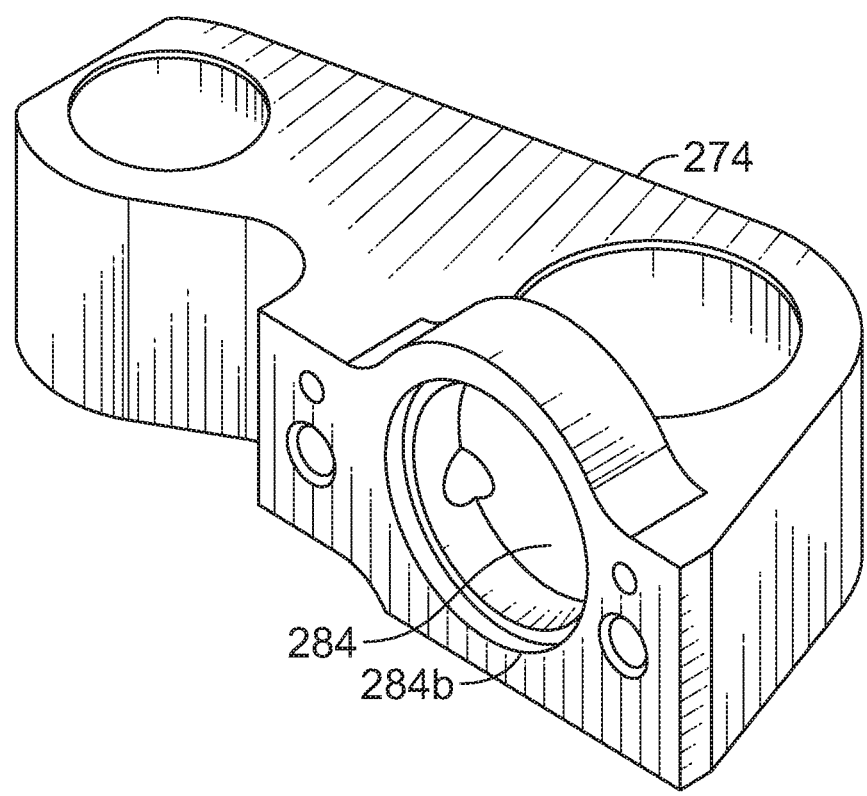
FIG. 32 is a perspective view of a right liquid passageway block of the liquid dispensing system.
Figure 33:
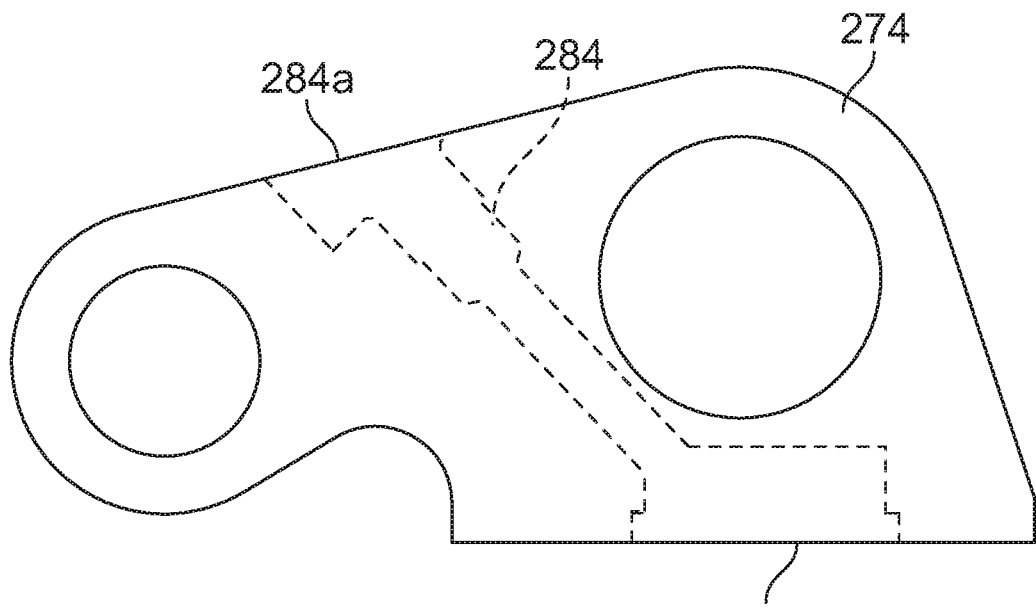
FIG. 33 is a top plan view of the right liquid passageway block showing the internal passageway in dotted line.

The right liquid passageway block 274 extends from the rear surface 88b of the wire tensioning base plate 88. The right liquid passageway block 274 may be integrally formed with the wire tensioning base plate 88 such that a one-piece member is provided. As shown in FIGS. 32 and 33, the right liquid passageway block 274 has a passageway 284 therethrough which extends from a rear thereof to a front thereof. The passageway 284 has a rear end 284a at the rear of the right liquid passageway block 274 and which is connected to the flexible conduit 278, and a front end 284b at the front of the right liquid passageway block 274 which is communication with an aperture (not shown) through the wire tensioning base plate 88. The right liquid passageway block 274 may take the form of a trunnion and have the guide shaft 32 extending therethrough and may further have a support rod 286 extending therethrough; the support rod 286 being affixed to the frame base plate 66.

Figure 34:
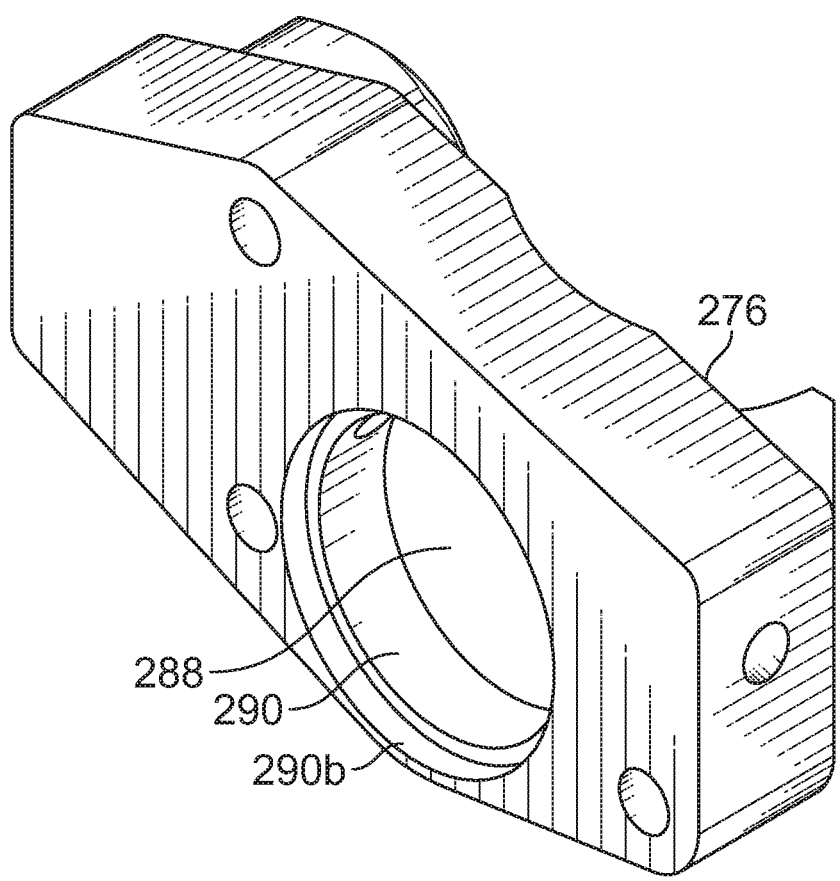
FIG. 34 is a perspective view of a left liquid passageway block of the liquid dispensing system.
Figure 35:
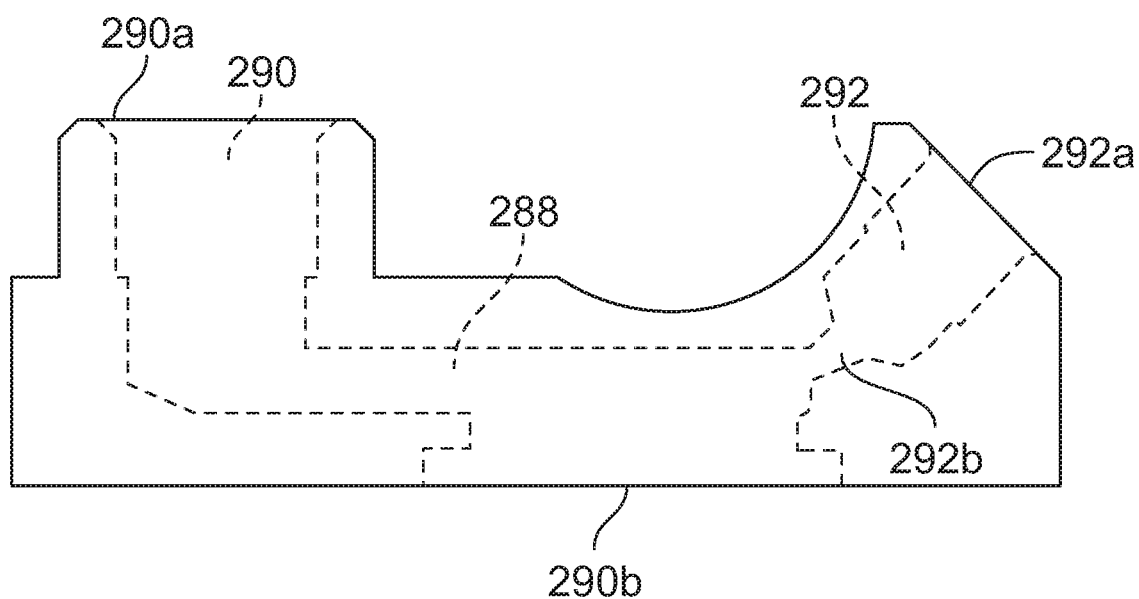
FIG. 35 is a top plan view of the left liquid passageway block showing the internal passageway in dotted line.

The left liquid passageway block 276 extends from the rear surface 66b of the frame base plate 66. The left liquid passageway block 276 may be integrally formed with the frame base plate 66 such that a one-piece member is provided. As shown in FIGS. 34 and 35, the left liquid passageway block 276 has a passageway 288 therethrough having a first branch 290 which extends from a rear of the left liquid passageway block 276 to a front of the left liquid passageway block 276, and a second branch 292 which extends from the first branch 290 to the rear of the left liquid passageway block 276. The first branch 290 has a rear end 290a at the rear of the left liquid passageway block 276 and which is connected to a source (not shown) of pressurized liquid, and a front end 290b at the front of the left liquid passageway block 276 which is in fluid communication with an aperture (not shown) through the frame base plate 66. The second branch 292 has a rear end 292a at the rear of the left liquid passageway block 276 and which is connected to the flexible conduit 278, and a front end 292b which is in fluid communication with the first branch 290.

Figure 36:
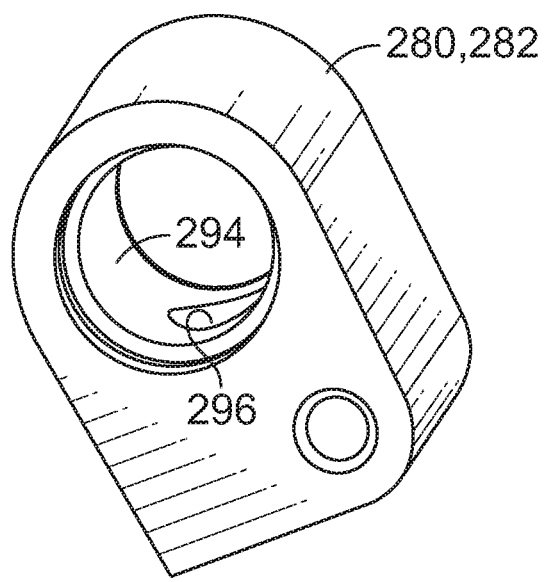
FIG. 36 is a perspective view of a mounting pin housing of the liquid dispensing system.
Figure 37:
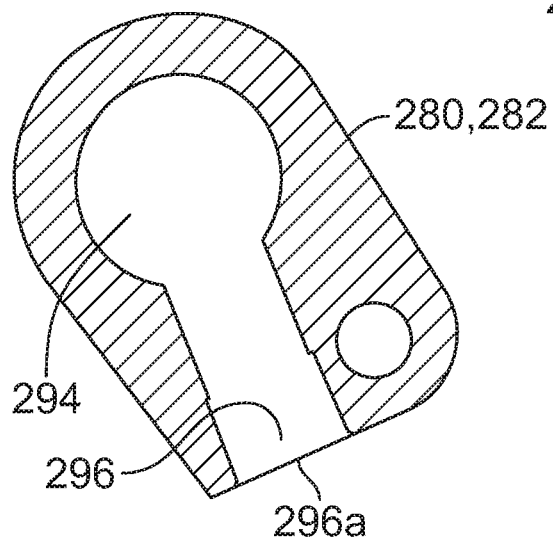
FIG. 37 is a first cross-sectional view of the mounting pin housing.
Figure 38:
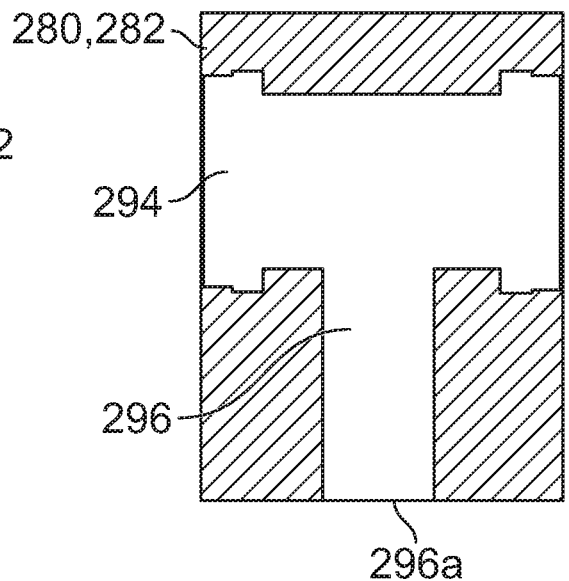
FIG. 38 is a second cross-sectional view of the mounting pin housing.

The right mounting pin housing 280 is seated between the plates 136, 138 of the right arm assembly 60, and the left mounting pin housing 282 is seated between the plates 158, 160 of the left arm assembly 62. Each mounting pin housing 280, 282 is identically formed. As shown in FIGS. 36-38, each mounting pin housing 280, 282 has a passageway 294 which extends axially from a rear end of the mounting pin housing 280, 282 to a front end of the mounting pin housing 280, 282, and a passageway 296 which intersects and extends radially outwardly from the passageway 294 to an exterior of the mounting pin housing 280, 282. In the right mounting pin housing 280, the conduit 270 is attached to the end 296a of the passageway 296. In the left mounting pin housing 282, the conduit 272 is attached to the end 296a of the passageway 296.

Figure 39:
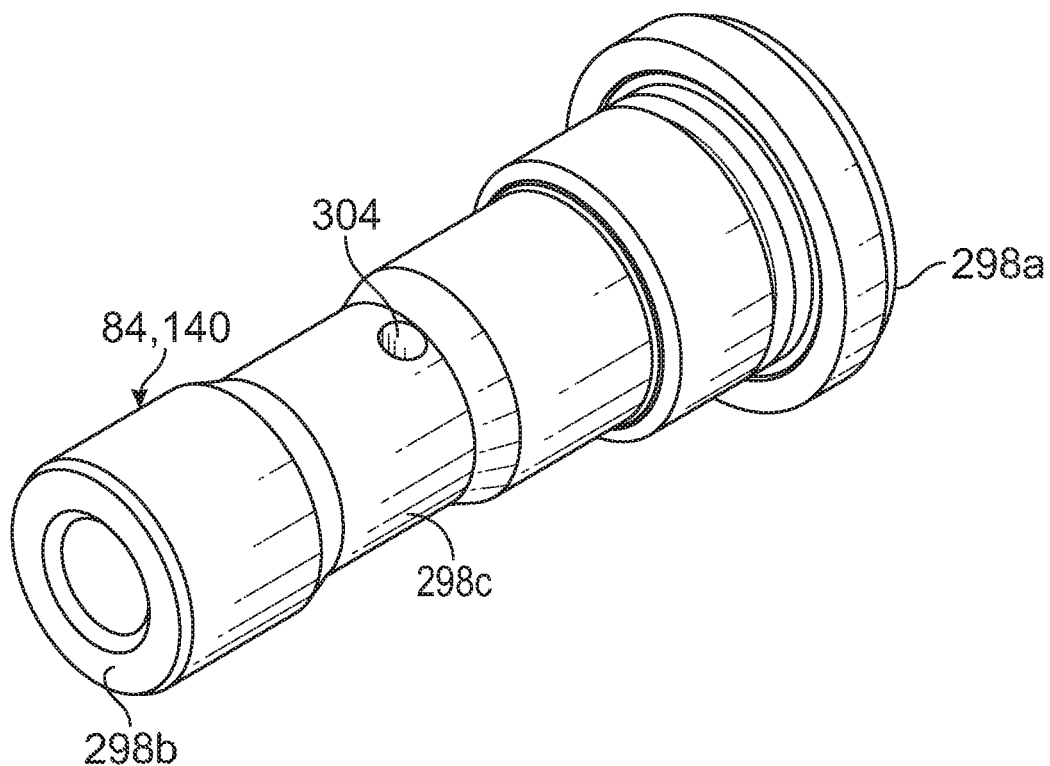
FIG. 39 is a front perspective view of an arm mounting pin.
Figure 40:
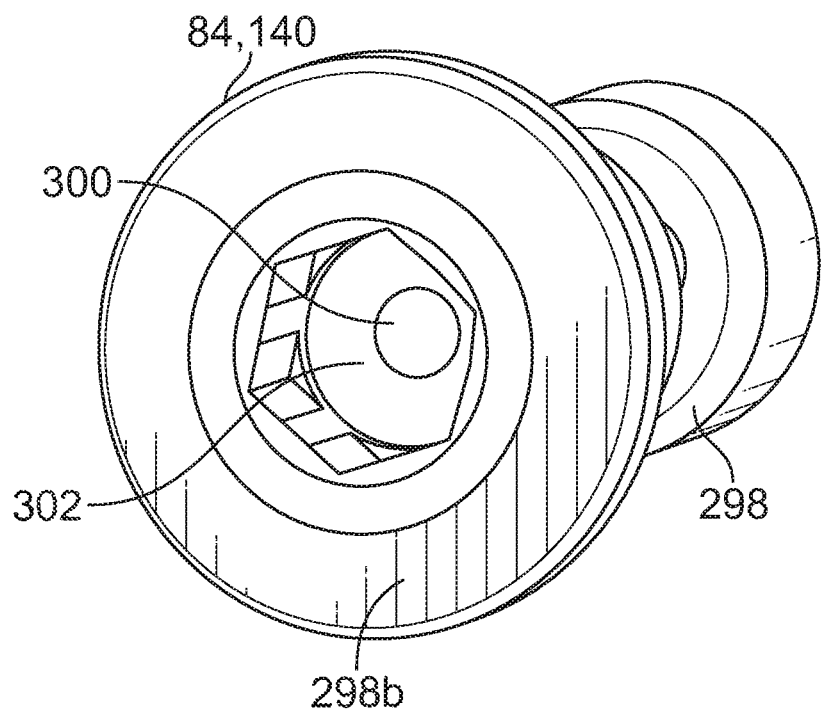
FIG. 40 is a rear perspective view of the arm mounting pin.
Figure 41:
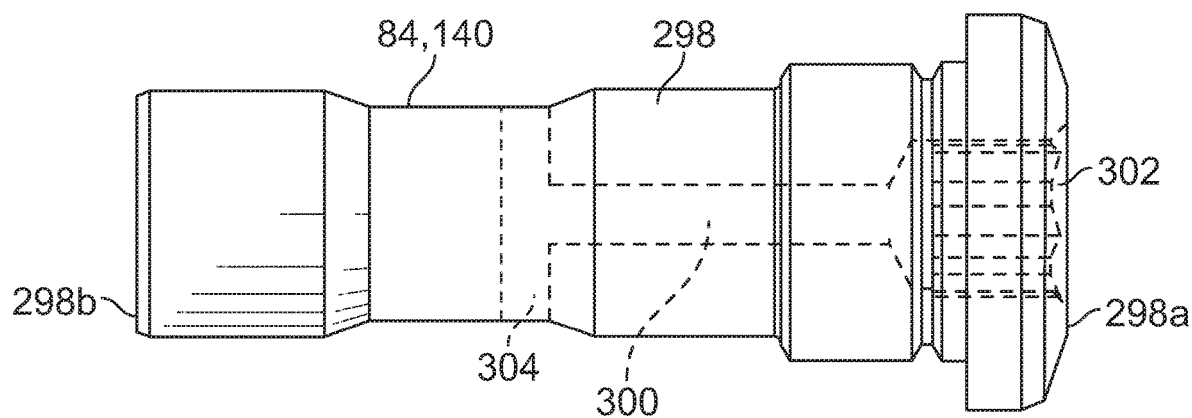
FIG. 41 is a top plan view of the arm mounting pin showing the internal bore and passageway in dotted line.

The arm mounting pins 84, 140 form part of the liquid dispensing assembly 264. Each arm mounting pin 84, 140 is identically formed. As shown in FIGS. 39-41, each arm mounting pin 84, 140 has a body 298 having a rear end 298a, a front end 298b and an exterior surface 298c, and a passageway therethrough which is formed from a bore 300 which extends axially from an opening 302 at the rear end 298a toward the front end 298b and a through hole 304 which extends diametrically across the arm mounting pin 84, 140 and intersects the bore 300 and terminates at the exterior surface 298c of the arm mounting pin 84, 140. The bore 300 is blind such that the bore 300 does not extend to the front end 298b of the arm mounting pin 84, 140.

Figure 42:
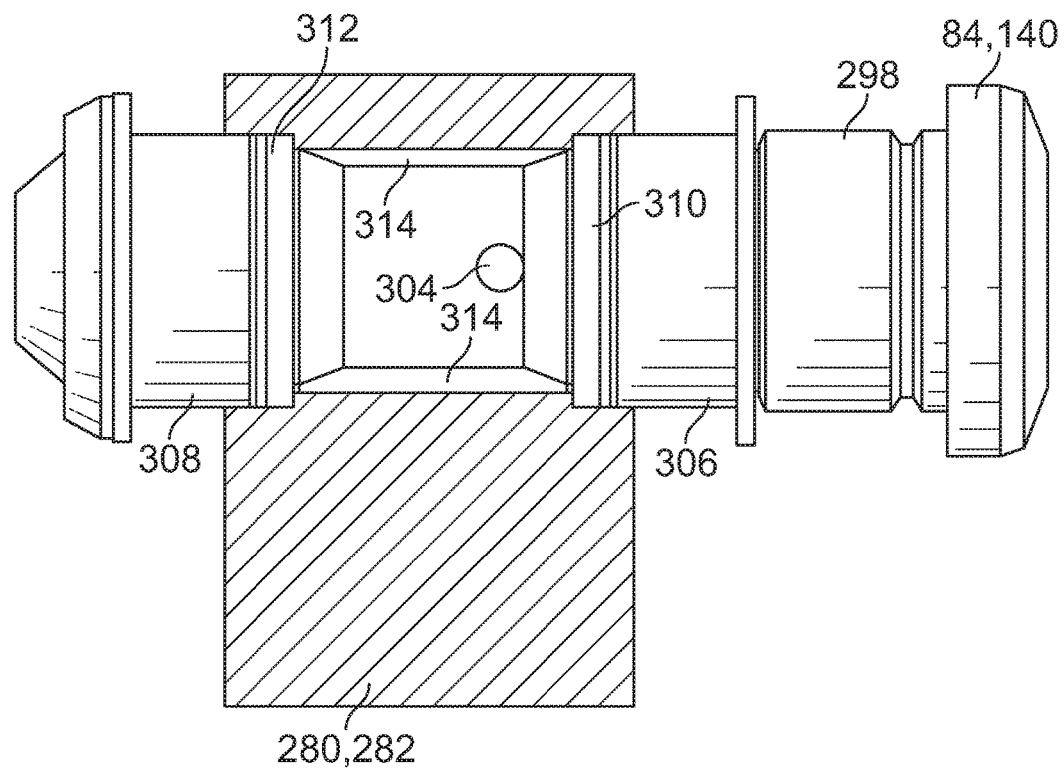
FIG. 42 is a top plan view of the arm mounting pin and showing the mounting pin housing in cross-section.

As shown in FIG. 42, each arm mounting pin 84, 140 has a pair of spaced apart bushings 306, 308 mounted thereon which encircle the body 298. For the right arm mounting pin 140, the plates 136, 138 are attached to the respective bushings 306, 308 which allow the plates 136, 138 to rotate relative to the right arm mounting pin 140. The right arm mounting pin 140 extends through plates 136, 138 and extends through the passageway 294 of the right mounting pin housing 280 such that the right mounting pin housing 280 is between the plates 136, 138. For the left arm mounting pin 84, the plates 158, 160 are attached to the respective bushings 306, 308 which allow the plates 158, 160 to rotate relative to the left arm mounting pin 84. The left arm mounting pin 84 extends through plates 158, 160 and extends through the passageway 294 of the left mounting pin housing 282 such that the left mounting pin housing 282 is between the plates 158, 160.

O-rings 310, 312 seal the mounting pin housings 280, 282 to the arm mounting pins 84, 140 such that a cavity 314 is provided between the right mounting pin housing 280 and the right arm mounting pin 140 and is provided between the left mounting pin housing 282 and the left arm mounting pin 84. The cavity 314 is in fluid communication with the bore 300 and the through hole 304 the passageways 294, 296 in the right mounting pin housing 280 and with the through hole in the arm mounting pin 140. In an embodiment, the O-rings 310, 312 are eliminated and the mounting pin housing 280, 282 and respective arm mounting pin 84, 140 are integrally formed with each other such that a one-piece member is provided.

In use, liquid flows from the source, through the first branch 290 of the left liquid passageway block 276 and flows through the second branch 292 thereof. The liquid in the first branch 290 flows through the opening 302 in the left arm mounting pin 84, through the bore 300 of the left arm mounting pin 84 and then through the through hole 304 of the left arm mounting pin 84. The liquid then flows into the cavity 314 between the left arm mounting pin 84 and the left mounting pin housing 282. The liquid flows through the passageway 296 of the left mounting pin housing 282 and then into the left conduit 272 to the left dispenser 268 in the left arm assembly 62. The liquid flows out of the left dispenser 268 and onto the left arm wheel 164. The liquid also flows from the second branch 292, through the flexible conduit 278 and into and through the passageway 284 in the right liquid passageway block 274. The liquid then flows through the opening 302 in the right arm mounting pin 140, through the bore 300 of the right arm mounting pin 140 and then through the through hole 304 of the right arm mounting pin 140. The liquid then flows into the cavity 314 between the right arm mounting pin 140 and the right mounting pin housing 280. The liquid flows through the passageway 296 of the right mounting pin housing 280 and then into the right conduit 270 to the right dispenser 266 in the right arm assembly 60. The liquid flows out of the right dispenser 266 and onto the right arm wheel 142. The flexible conduit 278 allows the movement between the operating position and the storage position of the arm assemblies 60, 62 as described. If the conduit 278 was completely rigid, the conduit 278 may break or fracture due to the movement of the arm assemblies 60, 62.

The two dispensers 266, 268 dispense a liquid onto the cutting member 26 and the adjacent arm wheel 142, 164 at or near the location where the cutting member 26 engages the wheel 142, 164. Each dispenser 266, 268 includes a liquid exhaust aperture and a deflector for deflecting the exhausted liquid at a desired angle. The deflector is angled to deflect the liquid at or near the point where the cutting member 26 engages the wheel 142, 164.

The pressurized liquid spray cools the cutting member 26 and removes debris during operation. Most of the components of the cutting apparatus 20 are located the rear surface 66b of the frame base plate 66 so as not to impede cleaning of debris or trap any debris. To clean any accumulated debris and prepare the cutting apparatus 20 for storage, the operator need only open the cover 64 and the latchable doors 250, 252, and spray the area with a source of liquid from an external hose.

The positions of the right and left liquid passageway blocks 274, 276 can be reversed.

It should be understood that when an element or component is, for example, coupled, secured, attached, mounted, connected, variants thereof, or equivalents thereof, to or with another element or component that such elements or components may be either unitarily formed as one-piece or separately formed.

It should also be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the cutting apparatus may be utilized in any orientation and use of such terms is intended to correspond to the exemplary orientation of the cutting apparatus illustrated in the drawings. The use of these terms in association with the cutting apparatus is not intended to limit the cutting apparatus to a single orientation or to limit the cutting apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, inventive subject matter lies in less than all features of a single disclosed embodiment.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A cutting apparatus comprising:
   a feed tower assembly configured to be attached to an object to be cut;
   a frame assembly mounted on the feed tower assembly, the frame assembly comprising a frame plate, a drive wheel mounted on the frame plate, a right arm assembly mounted on the frame plate and a left arm assembly mounted on the frame plate, at least one of the arm assemblies being movable relative to the frame plate and relative to the feed tower assembly, each arm assembly comprising an arm plate having an arm wheel rotatably mounted thereon;
   a cutting member partially wrapped around the arm wheels and the drive wheel; and
   a liquid dispensing system comprising a first block extending from the frame plate, a passageway extending through the first block, a second block extending from the frame plate, a passageway extending through the second block, a flexible conduit extending between the passageways in the blocks to provide fluid communication between the blocks, and wherein the liquid dispensing system in each arm assembly comprises:
an arm conduit proximate to the arm plate of each arm assembly,
a dispenser attached to the arm conduit, the dispenser being proximate to the arm wheel of the arm assembly,
an arm mounting pin attached to the frame plate and extending through the arm plate, the arm mounting pin having a passageway therethrough which is in fluid communication with the passageway in the respective block,
a pin housing mounted on the arm mounting pin, the pin housing being sealed to the arm mounting pin such that a cavity is formed between an inner surface of the pin housing and the exterior surface of the arm mounting pin, the pin housing having a passageway therethrough which is in fluid communication with the cavity, the passageway of the arm mounting pin being in fluid communication with the cavity and the passageway of the pin housing, the arm conduit being in fluid communication with the passageway of the pin housing, and
wherein the arm plate of the respective arm assembly is mounted on the respective arm mounting pin and is rotatable relative to the arm mounting pin.

2. The cutting apparatus of claim 1, wherein the frame assembly is movably mounted on the feed tower assembly.

3. The cutting apparatus of claim 1, wherein the frame plate of the frame assembly is formed of a first frame plate and a second frame plate, the second frame plate being movable relative to the first frame plate, the arm mounting pin of the left arm assembly being attached to the first frame, and the arm mounting pin of the right arm assembly being attached to the second frame plate.

4. The cutting apparatus of claim 1, wherein the arm plate of the respective arm assembly is mounted on the respective arm mounting pin by a bushing.

5. The cutting apparatus of claim 1, wherein each arm assembly has a second arm plate which is parallel to the first-defined arm plate and spaced therefrom, and wherein in each arm assembly, the arm wheel, the arm conduit and the dispenser are between the first and second arm plates.

6. The cutting apparatus of claim 5, wherein in the right arm assembly, each arm plate is mounted on the arm mounting pin therein by a bushing and wherein in the left arm assembly, each arm plate is mounted on the arm mounting pin therein by a bushing.

7. The cutting apparatus of claim 5, further comprising a plurality of doors extending between the arm plates, the doors being openable and closable.

8. The cutting apparatus of claim 7, further comprising a latch configured to maintain the doors in a closed position.

9. The cutting apparatus of claim 1, further comprising a cover hingedly mounted on the frame plate, the cover covering the drive wheel and an upper portion of each arm assembly when the cover is in a closed position.

10. The cutting apparatus of claim 9, further comprising a latch configured to maintain the cover in the closed position.

11. The cutting apparatus of claim 1, wherein the arm conduit in each arm assembly is rigid.

12. The cutting apparatus of claim 1, wherein the blocks and the frame plate are integrally formed.

13. The cutting apparatus of claim 12, wherein the arm mounting pins and the frame plate are integrally formed.

14. The cutting apparatus of claim 13, wherein in each arm assembly, the arm mounting pin and the respective pin housing are integrally formed.

15. The cutting apparatus of claim 1, wherein in each arm assembly, the arm mounting pin and the pin housing are integrally formed.

16. The cutting apparatus of claim 1, wherein the arm mounting pins and the frame plate are integrally formed.

17. The cutting apparatus of claim 16, wherein in each arm assembly, the arm mounting pin and the respective pin housing are integrally formed.

18. The cutting apparatus of claim 1, wherein in each arm mounting pin, the passageway of the arm mounting pin extends from an end portion of the arm mounting pin to the exterior surface of the arm mounting pin.

19. The cutting apparatus of claim 1, wherein in each arm assembly, the pin housing is sealed to the arm mounting pin by an O-ring.

* * * * *